United States Patent
Nishide et al.

(10) Patent No.: US 11,804,638 B2
(45) Date of Patent: Oct. 31, 2023

(54) SOLID-STATE BATTERY

(71) Applicant: Murata Manufacturing Co., Ltd., Nagaokakyo (JP)

(72) Inventors: Mitsuyoshi Nishide, Nagaokakyo (JP); Takayuki Nagano, Nagaokakyo (JP); Isao Tamaki, Nagaokakyo (JP); Tomohiro Kato, Nagaokakyo (JP); Akira Baba, Nagaokakyo (JP); Haruhiko Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 419 days.

(21) Appl. No.: 17/169,776

(22) Filed: Feb. 8, 2021

(65) Prior Publication Data

US 2021/0167471 A1 Jun. 3, 2021

Related U.S. Application Data

(63) Continuation of application No. PCT/JP2019/014259, filed on Mar. 29, 2019.

(30) Foreign Application Priority Data

Aug. 10, 2018 (JP) .................................. 2018-151910

(51) Int. Cl.
*H01M 50/545* (2021.01)
*H01M 50/519* (2021.01)
(Continued)

(52) U.S. Cl.
CPC ..... *H01M 50/545* (2021.01); *H01M 10/0525* (2013.01); *H01M 10/0585* (2013.01);
(Continued)

(58) Field of Classification Search
CPC .. H01M 50/545; H01M 50/519; H01M 50/11; H01M 50/141; H01M 50/131;
(Continued)

(56) References Cited

U.S. PATENT DOCUMENTS

| 2010/0040947 A1* | 2/2010 | Sennami ............. H01M 50/121 429/178 |
| 2010/0167130 A1* | 7/2010 | Pijnenburg ........ H01M 10/0436 429/304 |

(Continued)

FOREIGN PATENT DOCUMENTS

| CN | 107901536 A | 4/2018 |
| JP | H06203814 A | 7/1994 |

(Continued)

OTHER PUBLICATIONS

Japanese Office Action issued for JP Patent Application No. 2020-536310, date of Japanese Office Action dated Mar. 1, 2022.

(Continued)

*Primary Examiner* — Jane J Rhee
(74) *Attorney, Agent, or Firm* — ArentFox Schiff LLP

(57) ABSTRACT

A packaged solid-state battery that includes a solid-state battery having a top surface, a bottom surface, and side surfaces connecting the top surface to the bottom surface; a supporting substrate supporting the bottom surface of the solid-state battery; an insulating cover layer covering at least the top surface and the side surfaces of the solid-state battery; and an inorganic cover film on the insulating cover layer.

20 Claims, 12 Drawing Sheets

(51) Int. Cl.
| | |
|---|---|
| *H01M 50/131* | (2021.01) |
| *H01M 50/591* | (2021.01) |
| *H01M 50/119* | (2021.01) |
| *H01M 50/526* | (2021.01) |
| *H01M 50/124* | (2021.01) |
| *H01M 10/0525* | (2010.01) |
| *H01M 10/0585* | (2010.01) |
| *H01M 50/10* | (2021.01) |
| *H01M 50/543* | (2021.01) |
| *H01M 50/11* | (2021.01) |
| *H01M 50/141* | (2021.01) |
| *H01M 50/533* | (2021.01) |
| *H01M 50/593* | (2021.01) |

(52) U.S. Cl.
CPC ........... *H01M 50/10* (2021.01); *H01M 50/11* (2021.01); *H01M 50/119* (2021.01); *H01M 50/1245* (2021.01); *H01M 50/131* (2021.01); *H01M 50/141* (2021.01); *H01M 50/519* (2021.01); *H01M 50/526* (2021.01); *H01M 50/533* (2021.01); *H01M 50/543* (2021.01); *H01M 50/591* (2021.01); *H01M 50/593* (2021.01)

(58) Field of Classification Search
CPC ............. H01M 50/591; H01M 50/533; H01M 50/543; H01M 50/119; H01M 50/10; H01M 50/526; H01M 50/593; H01M 50/1245; H01M 10/0525; H01M 10/0585
See application file for complete search history.

(56) References Cited

U.S. PATENT DOCUMENTS

| | | | |
|---|---|---|---|
| 2012/0189912 A1* | 7/2012 | Honda | H01M 4/667 429/211 |
| 2017/0263900 A1 | 9/2017 | Kunze et al. | |
| 2017/0371190 A1* | 12/2017 | Yamazaki | G02F 1/136286 |
| 2018/0358649 A1* | 12/2018 | Inoue | H01M 10/0585 |

FOREIGN PATENT DOCUMENTS

| | | | |
|---|---|---|---|
| JP | 2006261008 A | 9/2006 |
| JP | 2007005279 A | 1/2007 |
| JP | 2010503957 A | 2/2010 |
| JP | 2012204160 A | 10/2012 |
| JP | 2014049308 A | 3/2014 |
| JP | 2015111532 A | 6/2015 |
| JP | 2015220099 A | 12/2015 |
| JP | 2015220107 A | 12/2015 |
| JP | 2018505515 A | 2/2018 |

OTHER PUBLICATIONS

International Search Report Issued for PCT/JP2019/014259, dated Jul. 2, 2019.
Written Opinion of the International Searching Authority issued for PCT/JP2019/014259, dated Jul. 2, 2019.

* cited by examiner

SOLID-STATE BATTERY

CROSS REFERENCE TO RELATED APPLICATIONS

The present application is a continuation of International application No. PCT/JP2019/014259, filed Mar. 29, 2019, which claims priority to Japanese Patent Application No. 2018-151910, filed Aug. 10, 2018, the entire contents of each of which are incorporated herein by reference.

FIELD OF THE INVENTION

The present invention relates to a solid-state battery. More specifically, the present invention relates to a solid-state battery packaged so as to be adapted for mounting on a substrate.

BACKGROUND OF THE INVENTION

A secondary battery that can be repetitively charged and discharged has been heretofore used for various applications. For example, the secondary battery is sometimes used as a power source of electronic devices such as a smartphone and a laptop computer.

The secondary battery generally includes a liquid electrolyte as a medium for movement of an ion contributing to the charge and discharge. That is, the secondary battery includes a so-called electrolytic solution. Such a secondary battery, however, is generally required to be safe in terms of preventing leakage of the electrolytic solution. In addition, since an organic solvent or the like used for the electrolytic solution is a combustible substance, the secondary battery is required to be safe also in that respect.

In order to satisfy these requirements, studies on solid-state batteries including a solid electrolyte in place of the electrolytic solution have progressed.

Patent Document 1: Japanese Patent Application Laid-Open No. 2015-220107
Patent Document 2: Japanese Patent Application Laid-Open No. 2007-5279

SUMMARY OF THE INVENTION

Solid-state batteries are typically used by being mounted together with another electronic component on a substrate such as a printed wiring board. In this case, a solid-state battery appropriate for mounting is required. Such a solid-state battery needs to take a necessary measure against infiltration of water vapor in an air atmosphere. This is because entry of moisture into the solid-state battery may possibly cause degradation of battery characteristics.

The inventors of the present application have noticed that a conventionally proposed solid-state battery still have problems to be overcome and found necessity to take a counter measure for these problems. Specifically, the inventors of the present application have found following problems.

Patent Document 1 proposes the solid-state battery disclosed therein as one exerting more excellent prevention of water-vapor transmission than the battery in Patent Document 2. Specifically, Patent Document 1 proposes disposing an additional layer recognized as a water-vapor prevention layer or a water-proof layer in a battery element body. Such an additional layer, however, is disposed only on an upper-surface side and a lower-surface side of the battery element body, and an end surface electrode portion is exposed on a side surface of the battery element body. Therefore, a possibility of the entry of water vapor from a peripheral vicinity or the like of the end surface electrode portion cannot be prevented, and such a solid-state battery is considered to be far from sufficiently preventing the entry of water vapor. In addition, the solid-state battery disclosed in Patent Document 1 even has a terminal thereof positioned at a side surface portion and is not considered necessarily having good surface mountability for reflow soldering mounting.

The present invention has been made in view of the problems. That is, a main object of the present invention is to provide a solid-state battery having mountability on a substrate and having more excellent performance of preventing the water-vapor transmission.

The inventors of the present application have attempted to solve the above problems not by taking a measure derived from a conventional technique but by a new way. This attempt has resulted in achieving the main object, and an invention of a solid-state battery has been attained.

The present invention provides a packaged solid-state battery that includes a solid-state battery having a top surface, a bottom surface, and side surfaces connecting the top surface to the bottom surface; a supporting substrate supporting the bottom surface of the solid-state battery; an insulating cover layer covering the top surface and the side surfaces of the solid-state battery; and an inorganic cover film on the insulating cover layer.

The solid-state battery according to the present invention has mountability on a substrate and has more excellent performance of preventing water-vapor transmission.

More specifically, the present invention is a solid-state battery packaged mainly from the viewpoint of preventing water-vapor transmission (hereinafter, such a packaged solid-state battery is also referred to as a "battery package"). The battery package according to the present invention more certainly prevents a possibility of the entry of water vapor in the external environment into the solid-state battery, due to at least cover materials such as an insulating cover layer and an inorganic cover film that cover a top surface and a side surface of the solid-state battery disposed on a supporting substrate. In addition, the supporting substrate positioned at a bottom of the battery is provided not only as a water-vapor barrier substrate but as an external terminal substrate of the solid-state battery, and therefore, the battery package according to the present invention is preferable in terms of mountability.

DETAILED DESCRIPTION OF THE INVENTION

Figure 1:
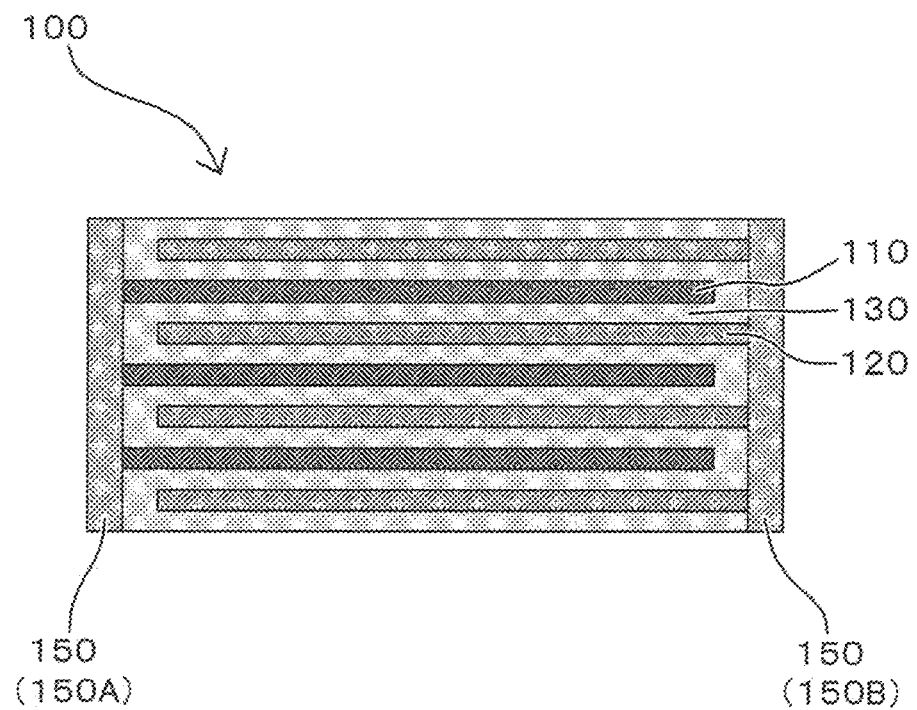
FIG. 1 is a section schematically illustrating an internal configuration of a solid-state battery.

Hereinafter, the solid-state battery according to the present invention is described in detail. While the solid-state battery is described with reference to the drawings as necessary, the contents illustrated in the drawings are only schematically and illustratively shown for understanding the present invention, and the appearance, the dimensional ratio, and the like can be different from the actual ones.

The "packaged solid-state battery" referred to in the present specification broadly means a solid-state battery protected from the external environment, and narrowly indicates a solid-state battery provided with a transmission barrier so as not allow the entry of water vapor in the external environment into the solid-state battery. The "water vapor" referred to herein indicates moisture represented by water vapor in the atmosphere, and means, in a preferred aspect, not only water vapor in the form of gas but also moisture encompassing liquid water. Preferably, the solid-state battery according to the present invention in which such moisture transmission is prevented is packaged so as to be adapted for mounting on a substrate and is packaged so as to be adapted particularly for surface mounting. Therefore, in a preferred aspect, the battery according to the present invention is a SMD-type battery.

The "sectional view" referred to in the present specification is based on a form of the solid-state battery viewed from a direction substantially orthogonal to the thickness direction based on the stacking direction of layers constituting the solid-state battery (simply, a form of the solid-state battery cut along a surface parallel with the thickness direction). The "lengthwise direction" and the "transverse direction" directly or indirectly used in the present specification respectively correspond to the lengthwise direction and the transverse direction in the drawings. The same signs or symbols represent the same member/site or the same meaning and content, unless otherwise specified. In a preferred aspect, the vertically downward (that is, the direction affected by gravity) can be considered to correspond to the "downward direction"/"bottom-surface side", and the direction opposite to the vertically downward can be regarded as corresponding to the "upward direction"/"top-surface side."

The "solid-state battery" referred to in the present invention broadly indicates a battery formed of constituents that are solid, and narrowly indicates an all-solid-state battery formed of constituents (particularly preferably all the constituents) that are solid. In a preferred aspect, the solid-state battery according to the present invention is a multilayer solid-state battery formed to include layers that constitute battery-constituent units and are stacked on top of another, and such layers are preferably formed of sintered bodies. The "solid-state battery" encompasses not only a so-called "secondary battery" that can be repetitively charged and discharged, but also a "primary battery" that can only be discharged. According to a preferred aspect of the present invention, the "solid-state battery" is a secondary battery. The "secondary battery" is not excessively restricted by the name and can also encompass, for example, a power storage device.

Hereinafter, a basic configuration of the solid-state battery according to the present invention is first described. The configurations of the solid-state battery described here are just illustrative for understanding the invention, and are not to limit the invention.

[Basic Configuration of Solid-State Battery]

The solid-state battery is formed to include at least electrode layers of a positive electrode and a negative electrode, and a solid electrolyte. Specifically, as illustrated in FIG. 1, a solid-state battery 100 is formed to include a solid-state battery laminate having battery constituent units formed of a positive electrode layer 110, a negative electrode layer 120, and a solid electrolyte 130 at least interposed between the positive electrode layer 110 and the negative electrode layer 120.

The solid-state battery is formed by firing the layers constituting the solid-state battery, and the positive electrode layer, the negative electrode layer, the solid electrolyte, and the like are sintered layers. Preferably, the positive electrode layer, the negative electrode layer, and the solid electrolyte are integrally fired together, and therefore, the solid-state battery laminate is an integrated sintered body.

The positive electrode layer 110 is an electrode layer formed to contain at least a positive electrode active material. The positive electrode layer may be formed to further contain a solid electrolyte. In a preferred aspect, the positive electrode layer is formed of a sintered body containing at least positive electrode active material grains and solid electrolyte grains. On the other hand, the negative electrode layer is an electrode layer formed to contain at least a negative electrode active material. The negative electrode layer may be formed to further contain a solid electrolyte. In a preferred aspect, the negative electrode layer is formed of a sintered body containing at least negative electrode active material grains and solid electrolyte grains.

The positive electrode active material and the negative electrode active material are materials involving delivery of an ion in the solid-state battery. Movement (conduction) of an ion between the positive electrode layer and the negative electrode layer via the solid electrolyte allows delivery of an electron, and the charge and discharge is thus attained. The positive electrode layer and the negative electrode layer are preferably layers capable of storing and releasing particularly a lithium ion. That is, the solid-state battery is preferably an all-solid-state secondary battery that allows movement of a lithium ion between the positive electrode layer and the negative electrode layer via the solid electrolyte and that is thus charged and discharged.

(Positive Electrode Active Material)

The positive electrode active material contained in the positive electrode layer is, for example, at least one selected from the group consisting of a lithium-containing phosphate compound having a NASICON-type structure, a lithium-containing phosphate compound having an olivine-type structure, a lithium-containing layered oxide, a lithium-containing oxide having a spinel-type structure, and the like. Examples of the lithium-containing phosphate compound having a NASICON-type structure include $Li_3V_2(PO_4)_3$. Examples of the lithium-containing phosphate compound having an olivine-type structure include $Li_3Fe_2(PO_4)_3$, $LiFePo_4$, and $LiMnPO_4$. Examples of the lithium-containing layered oxide include $LiCoO_2$ and $LiCo_{1/3}Ni_{1/3}Mn_{1/3}O_2$. Examples of the lithium-containing oxide having a spinel-type structure include $LiMn_2O_4$ and $LiNi_{0.5}Mn_{1.5}O_4$.

(Negative Electrode Active Material)

The negative electrode active material contained in the negative electrode layer 120 is, for example, at least one selected from the group consisting of an oxide containing at least one element selected from the group consisting of Ti, Si, Sn, Cr, Fe, Nb, and Mo, a graphite-lithium compound, a lithium alloy, a lithium-containing phosphate compound having a NASICON-type structure, a lithium-containing phosphate compound having an olivine-type structure, a lithium-containing oxide having a spinel-type structure, and the like. Examples of the lithium alloy include Li—Al. Examples of the lithium-containing phosphate compound having a NASICON-type structure include $Li_3V_2(PO_4)_3$ and $LiTi_2(PO_4)_3$. Example of the lithium-containing phosphate compound having an olivine-type structure include $Li_3Fe_2(PO_4)_3$ and $LiCuPO_4$. Examples of the lithium-containing oxide having a spinel-type structure include $Li_4Ti_5O_{12}$.

The positive electrode layer and/or the negative electrode layer may contain a conductive auxiliary agent. The conductive auxiliary agent contained in the positive electrode layer and the negative electrode layer is, for example, at least one formed of a metal material such as silver, palladium, gold, platinum, aluminum, copper, or nickel, carbon, or the like.

Further, the positive electrode layer and/or the negative electrode layer may also contain a sintering additive. The sintering additive is, for example, at least one selected from the group consisting of a lithium oxide, a sodium oxide, a potassium oxide, boron oxide, silicon oxide, bismuth oxide, and phosphoric oxide.

(Solid Electrolyte)

The solid electrolyte is a material capable of conducting a lithium ion. The solid electrolyte constituting a battery constituent unit particularly in the solid-state battery is a layer capable of conducting a lithium ion between the positive electrode layer and the negative electrode layer. Specific examples of the solid electrolyte include a lithium-containing phosphate compound having a NASICON structure, an oxide having a perovskite structure, and an oxide having a garnet-type or garnet-like structure. Examples of the lithium-containing phosphate compound having a NASI-CON structure include $Li_xM_y(PO_4)_3$ ($1 \le x \le 2$, $1 \le y \le 2$, M is at least one selected from the group consisting of Ti, Ge, Al, Ga, and Zr). Examples of the lithium-containing phosphate compound having a NASICON structure include $Li_{1.2}Al_{0.2}Ti_{1.8}(PO_4)_3$. Examples of the oxide having a perovskite structure include $La_{0.55}Li_{0.35}O_3$. Examples of the oxide having a garnet-type or garnet-like structure include $Li_7La_3Zr_2O_{12}$.

The solid electrolyte layer may contain a sintering additive. The sintering additive contained in the solid electrolyte layer may be selected from, for example, the same materials for the sintering additive that can be contained in the positive electrode layer/the negative electrode layer.

(Positive Electrode Current Collector Layer and Negative Electrode Current Collector Layer)

The positive electrode layer 110 and the negative electrode layer 120 may respectively include a positive electrode current collector layer and a negative electrode current collector layer. The positive electrode current collector layer and the negative electrode current collector layer may each have the form of a foil, but may have the form of a sintered body from the viewpoint of reducing the costs for manufacturing the solid-state battery by integral firing and reducing the internal resistance of the solid-state battery. When having the form of a sintered body, the positive electrode current collector layer and the negative electrode current collector layer may each be formed of a sintered body containing a conductive auxiliary agent and a sintering additive. The conductive auxiliary agent contained in the positive electrode current collector layer and the negative electrode current collector layer may be selected from, for example, the same materials for the conductive auxiliary agent that can be contained in the positive electrode layer and the negative electrode layer. The sintering additive contained in the positive electrode current collector layer and the negative electrode current collector layer may be selected from, for example, the same materials for the sintering additive that can be contained in the positive electrode layer/the negative electrode layer. In the solid-state battery, the positive electrode current collector layer and the negative electrode current collector layer are not necessarily essential, and the solid-state battery not including such a positive electrode current collector layer or a negative electrode current collector layer is considered also acceptable. That is, the solid-state battery according to the present invention may be a current collector layer-free solid-state battery.

(End Surface Electrode)

The solid-state battery generally includes an end surface electrode 150. The solid-state battery includes the end surface electrode disposed particularly on a side surface thereof. More specifically, a positive electrode-side end surface electrode 150A connected to the positive electrode layer 110 and a negative electrode-side end surface electrode 150B connected to the negative electrode layer 120 are disposed (see FIG. 1). Such end surface electrodes are preferably formed to contain a material having large conductivity. A specific material for the end surface electrodes is not particularly limited and is, for example, at least one selected from the group consisting of silver, gold, platinum, aluminum, copper, tin, and nickel.

[Features of Solid-State Battery According to the Present Invention]

The solid-state battery according to the present invention is a packaged battery. Particularly, the solid-state battery according to the present invention is a solid-state battery packaged for contributing to prevention of water-vapor transmission. Therefore, the solid-state battery according to the present invention has a package structure having a feature in terms of preventing the water-vapor transmission.

Figure 2:
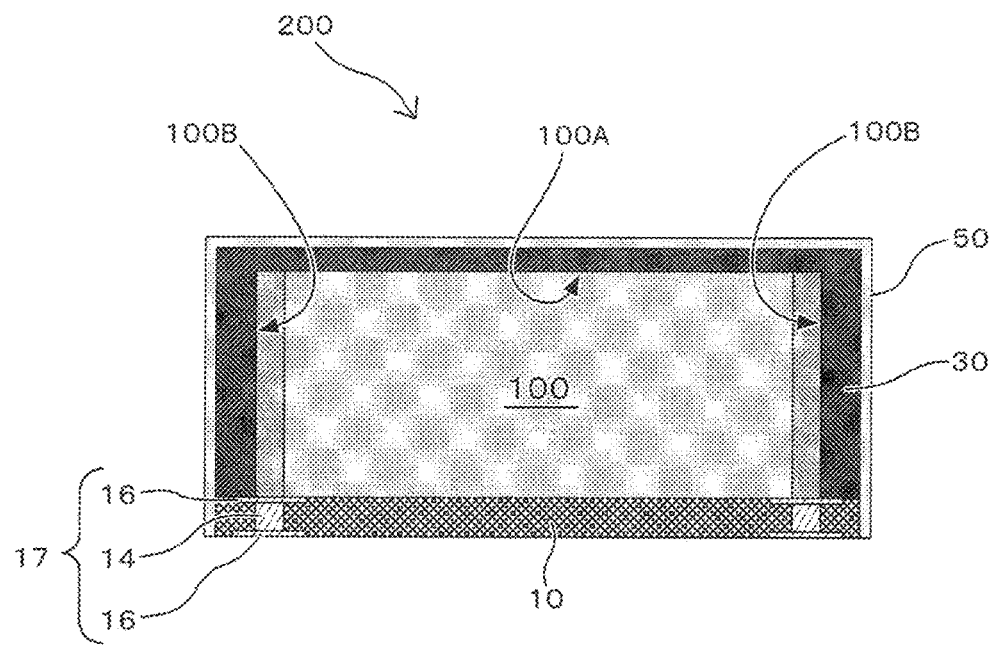
FIG. 2 is a section schematically illustrating a configuration of a packaged solid-state battery according to one embodiment of the present invention.

Specifically, the solid-state battery 100 according to the present invention has a package structure including, as illustrated in FIG. 2, a supporting substrate 10, an insulating cover layer 30, and an inorganic cover film 50. Such a battery package 200 includes the supporting substrate 10, the insulating cover layer 30, and the inorganic cover film 50 around the solid-state battery 100 so as to entirely surround the solid-state battery 100 (without allowing any of the surfaces constituting the solid-state battery to be externally exposed).

The supporting substrate 10 is a substrate disposed so as to support the solid-state battery 100. The supporting substrate is positioned on one of main surfaces of the solid-state battery to provide the "support." The supporting substrate that serves as the "substrate" preferably has, as a whole, a thin plate-shaped form.

The supporting substrate 10 may be a resin substrate or a ceramic substrate. In a preferred aspect, the supporting substrate 10 is a ceramic substrate. That is, the supporting substrate 10 is formed to contain ceramic, which accounts for most of a base material component of the substrate. The supporting substrate formed of ceramic contributes to prevention of the water-vapor transmission, and is a preferable substrate in terms of heat resistance and the like in mounting on a substrate. Such a ceramic substrate can be obtained by firing and can be obtained by firing, for example, a green sheet laminate. As regards the firing, the ceramic substrate may be, for example, a LTCC (Low Temperature Co-fired Ceramics) substrate or a HTCC (High Temperature Co-fired Ceramic) substrate. The thickness of the supporting substrate is preferably 20 μm to 1000 μm and, for example, most preferably 100 μm to 300 μm (just an example).

The insulating cover layer 30 is a layer disposed so as to cover at least a top surface 100A and a side surface 100B of the solid-state battery 100. As illustrated in FIG. 2, the solid-state battery 100 disposed on the supporting substrate 10 is entirely and extensively enclosed by the insulating cover layer 30. In a preferred aspect, the insulating cover layer 30 is disposed in an entire battery surface region of the top surface 100A and the side surface 100B of the solid-state battery 100 (all of at least the battery "top surface" region and the battery "side surface" region).

As understood from the description above, the "top surface" referred to in the present specification means a surface positioned relatively upper than the surfaces constituting the battery. Assuming a typical solid-state battery including two opposite mains surfaces, the "top surface" referred to in the present specification indicates one of the main surfaces and means particularly a main surface on a side different from the main surface (that is, a mounting-surface side of a SMD-type battery described later) positioned near the supporting substrate. Thus, "the insulating cover film disposed so as to cover the top surface and the side surface of the solid-state battery" referred to in the present invention substantially means at least disposing the insulating cover film on battery surfaces other than a surface/a surface region to be in contact with a plane on which the solid-state battery is assumingly laid.

The insulating cover layer 30 preferably corresponds to a resin layer. That is, the insulating cover layer 30 is formed to contain a resin material, which preferably constitutes a base material of the layer. As understood from the aspect illustrated in the drawing, a resin material constituting a base material of the insulating cover layer means that the solid-state battery disposed on the supporting substrate 10 is sealed with the resin material of the insulating cover layer 30. The insulating cover layer 30 formed of such a resin material contributes to a suitable water-vapor barrier together with the inorganic cover film 50.

The material for the insulating cover layer may be any type of material as long as the material has an insulating property. For example, when the insulating cover layer is formed to contain a resin, the resin may be either a thermosetting resin or a thermoplastic resin. The resin is not particularly limited, and specific examples of the resin material for the insulating cover layer include an epoxy-based resin, a silicone-based resin, and a liquid crystal polymer. The thickness of the insulating cover layer is preferably 30 μm to 1000 μm and, for example, most preferably 50 μm to 300 μm (just an example).

The inorganic cover film 50 is disposed so as to cover the insulating cover layer 30. As illustrated in the drawing, the inorganic cover film 50 positioned on the insulating cover layer 30 has a form of entirely and extensively enclosing the solid-state battery 100 on the supporting substrate 10 together with the insulating cover layer 30.

The inorganic cover film 50 preferably has a thin-film form. The material for the inorganic cover film 50 is not particularly limited as long as the material is usable for the inorganic layer having a thin-film form, and the material may be, for example, a metal, glass, oxide ceramic, or a mixture thereof. In a preferred aspect, the inorganic cover film 50 is formed to contain a metal component. That is, the inorganic cover film 50 is preferably a metal thin film. The thickness of such an inorganic cover film is preferably 0.1 μm to 100 μm and, for example, most preferably 1 μm to 50 μm (just an example).

The inorganic cover film 50 focused particularly with regard to the manufacturing method thereof may be a dry plating film. The dry plating film is a film obtained by a gas phase method such as physical vapor deposition (PVD) or chemical vapor deposition (CVD) and has a very small thickness in nano order or micron order. Such a thin dry plating film contributes to more compact packaging.

The dry plating film may be formed of, for example, at least one metal component/metalloid component selected from the group consisting of aluminum (Al), nickel (Ni), palladium (Pd), silver (Ag), tin (Sn), gold (Au), copper (Cu), titanium (Ti), platinum (Pt), silicon (Si), SUS, and the like, an inorganic oxide, and/or a glass component. The dry plating film formed of such a component is chemically and/or thermally stable and has therefore, for example, excellent chemical resistance, weather resistance, and/or heat resistance, so that the solid-state battery further improved in long-term reliability can be produced.

In the present invention, the solid-state battery is packaged with the insulating cover layer and the inorganic cover film disposed so as to enclose the solid-state battery on the supporting substrate. Particularly, the solid-state battery is packaged so as to be adapted for surface mounting. In this respect, the supporting substrate is preferably a terminal substrate in the present invention. In other words, the supporting substrate according to a preferred aspect is a terminal substrate for an external terminal of the packaged solid-state battery, that is, an external terminal substrate.

The solid-state battery provided with the supporting substrate as a terminal substrate can be mounted on a different secondary substrate such as a printed wiring board, in a form of interposing the substrate between the solid-state battery and the different secondary substrate. The solid-state battery can be surface-mounted by reflow soldering or the like, with the supporting substrate interposed. For the reasons described above, the packaged solid-state battery according to the present invention can also be considered to be a SMD (Surface Mount Device)—type battery. Particularly when the terminal substrate is formed of a ceramic substrate, the solid-state battery according to the present invention can be a SMD-type battery that has high heat resistance and can be solder-mounted.

The supporting substrate that serves as a terminal substrate preferably includes wiring, preferably includes wiring particularly electrically connecting the upper and lower surfaces or the upper and lower surface layers. That is, the supporting substrate in a preferred aspect includes wiring electrically connecting the upper and lower surfaces of the substrate and is a terminal substrate for the external terminal of the packaged solid-state battery. This aspect enables the wiring of the supporting substrate to be used for extension from the solid-state battery to the external terminal and therefore does not need a terminal to be extended to the exterior of the package using a metal tag while packing the metal tag with a water-vapor barrier layer. Thus, the design freedom of the external terminal is increased.

The wiring in the terminal substrate is not particularly limited and may have any form as long as the wiring contributes to electrical connection between the upper surface and the lower surface of the substrate. The wiring in the terminal substrate that contributes to electrical connection can also be considered to be a conductive portion of the substrate. Such a conductive portion of the substrate may have the form of a wiring layer, a via, and/or a land. For example, in the aspect illustrated in FIG. 2, a via 14 and/or a land 16 is disposed on the supporting substrate 10. The "via" referred to herein indicates a member for attaining electrical connection in the lengthwise direction of the supporting substrate, or the thickness direction of the substrate, and is preferably, for example, a filled via or may be, for example, in the form of an inner via. The "land" referred to in the present specification indicates a terminal portion/a connection portion (a terminal portion/a connection portion preferably connected to the via) for electrical connection disposed on an upper main surface and/or a lower main surface of the supporting substrate, and may be, for example, a square land or a circular land.

The terminal substrate having such a conductive portion enables the extension position of the external terminal of the battery package to be set at any lower portion of the package. In addition, as understood from the form illustrated in FIG. 2, the extension shape of such an external terminal has substantially no protrusion or recess and can be provided as a smooth flat surface in plane with the mounting package. The solid-state battery provided with such a substrate enables extension of a terminal from the battery to the exterior of the package in the shortest distance, and therefore, a loss-reduced battery package can be produced. In addition, the solid-state battery including such a substrate is also considered to enable disposition of the terminal of the battery package at a position optimal to a peripheral circuit or a housing in which the battery is to be used.

In the terminal substrate of the present invention, the opposite upper and lower surfaces are electrically connected to each other. Therefore, as long as such electrical connection is attained, the type of the terminal substrate is not particularly limited. For example, a component mounting-compatible interposer enabling lengthwise connection may be used as the terminal substrate. The substrate material for the interposer is not particularly limited to silicon but may be ceramic.

In the solid-state battery provided with the supporting substrate as a terminal substrate, the wiring of the supporting substrate and a terminal portion of the solid-state battery are electrically connected to each other. That is, conductive portions of the supporting substrate and the end surface electrodes of the solid-state battery are electrically connected to each other. Preferably, conductive portions of the supporting substrate and the end surface electrodes of the solid-state battery are electrically connected to each other. For example, the positive electrode-side end surface electrode of the solid-state battery is electrically connected to a positive electrode-side conductive portion of the supporting substrate, whereas the negative electrode-side end surface electrode of the solid-state battery is electrically connected to a negative electrode-side conductive portion of the supporting substrate. This configuration enables the positive electrode-side and negative electrode-side conductive portions (particularly lower lands/bottom-surface lands) of the supporting substrate to be provided respectively as a positive electrode terminal and a negative electrode terminal of the solid-state battery package.

Figure 3:
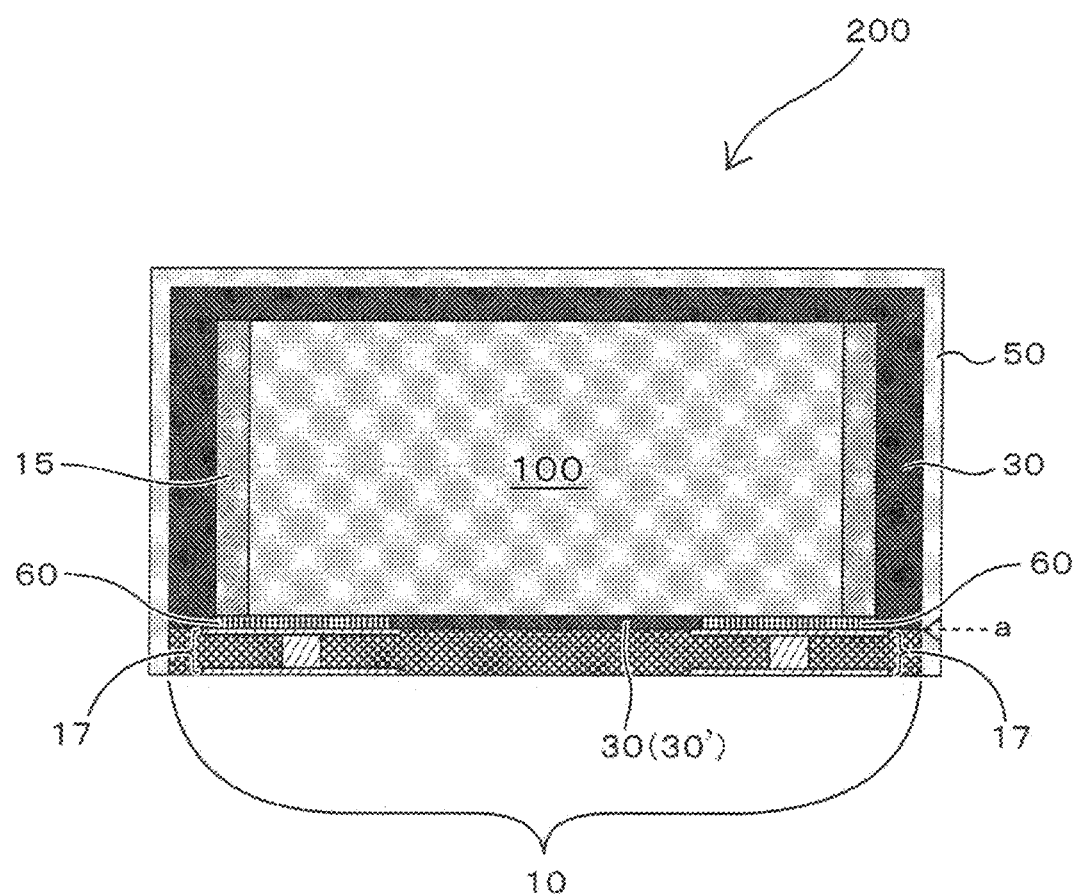
FIG. 3 is a section schematically illustrating a configuration of a packaged solid-state battery according to another embodiment (placement of a conductive connection portion) of the present invention.
Figure 4:
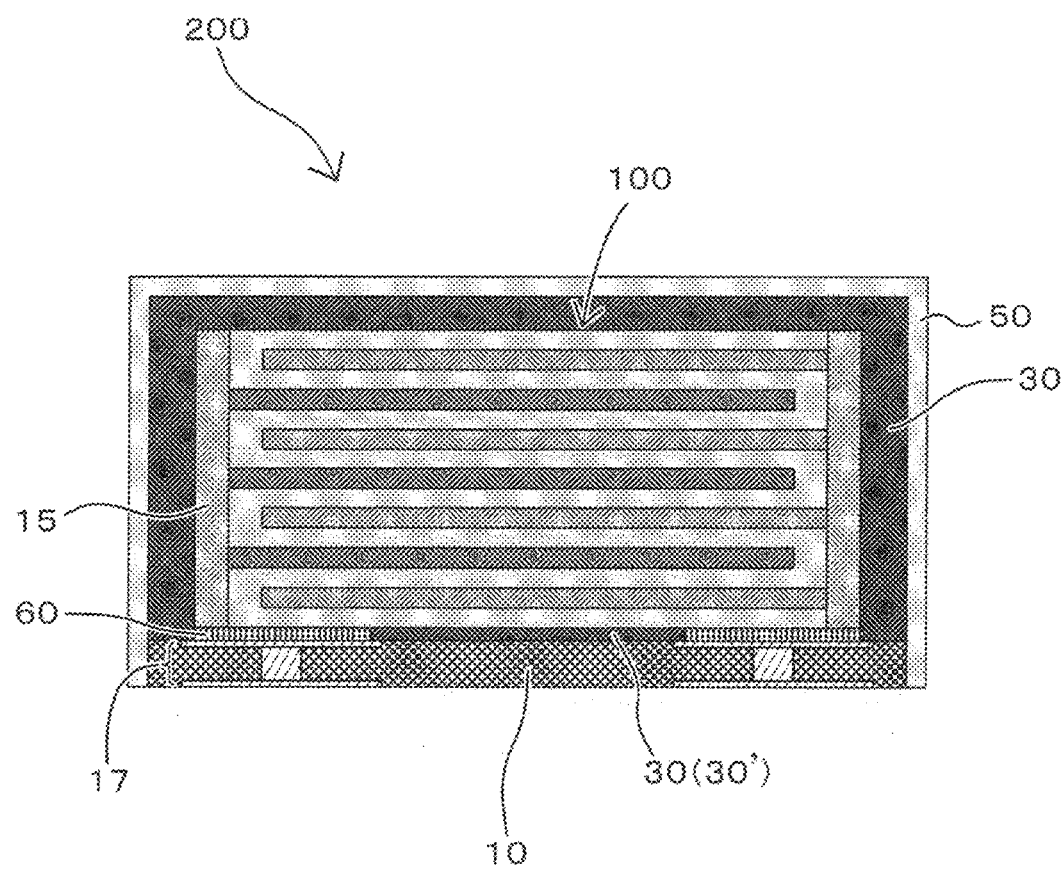
FIG. 4 is a section schematically illustrating a packaged solid-state battery according to another embodiment (placement of a conductive connection portion) of the present invention together with an internal configuration of the solid-state battery.

The solid-state battery according to the present invention may further include a member that contributes to suitable electrical connection between the terminal substrate and the solid-state battery. For example, the solid-state battery according to the present invention may be formed to further include, as illustrated in FIGS. 3 and 4, a conductive connection portion 60 electrically connecting an end surface electrode 15 and a conductive portion 17 to each other on the substrate. The conductive connection portion 60 may be one formed using a paste formed to contain at least one selected from the group consisting of silver (Ag), copper (Cu), palladium (Pd), gold (Au), platinum (Pt), aluminum (Al), nickel (Ni), and the like. FIGS. 3 and 4 each illustrate a solid-state battery having the same aspect, and FIG. 4 illustratively shows an internal configuration of the solid-state battery for better understanding of the invention.

When including the conductive connection portion 60, the solid-state battery may include the insulating cover layer disposed in a gap between the solid-state battery and the supporting substrate that is formed due to the interposition of the conductive connection portion. That is, an insulating cover layer 30' may be disposed also between the solid-state battery 100 and the supporting substrate 10 (see FIGS. 3 and 4). More specifically, the insulating cover layer 30' may be disposed not only on the top surface and the side surface of the solid-state battery 100 but also in the gap positioned between the bottom surface of the solid-state battery 100 and the upper surface of the supporting substrate 10.

The solid-state battery according to the present invention is packaged with the supporting substrate, the insulating cover layer, and the inorganic cover film, and is therefore a battery having particularly excellent performance of preventing the water-vapor transmission. That is, the battery package according to the present invention more certainly prevents degradation of battery characteristics caused by water vapor (more specifically, a phenomenon of allowing water vapor in the external environment to be mixed in the solid-state battery to degrade the characteristics of the solid-state battery), at least due to the insulating cover layer and the inorganic cover film that cover the top surface and the side surface of the solid-state battery on the supporting substrate.

Preferably, the inorganic cover film is a water-vapor barrier film. That is, the inorganic cover film covers the top surface and the side surface of the solid-state battery so as to be preferably provided as a barrier that blocks the entry of moisture into the solid-state battery. The "barrier" in the present specification broadly means having a characteristic of blocking the water-vapor transmission in order not to allow water vapor in the external environment to permeate the inorganic cover film and thus in order not to cause degradation of characteristics that is inconvenient to the solid-state battery, and narrowly means having a water-vapor transmission rate of less than $1.0 \times 10^{-3}$ g/(m²·Day). Therefore, simply, the water-vapor barrier film is considered to have a water-vapor transmission rate of preferably 0 to less than $1.0 \times 10^{-3}$ g/(m²·Day). The "water-vapor transmission rate" referred to herein indicates a transmission rate obtained using a gas transmission rate measurement system (model GTms-1 manufactured by ADVANCE RIKO, Inc.) under the measurement conditions of 40° C., 90% RH, and a differential pressure of 1 atm.

In a preferred aspect, the insulating cover layer and the inorganic cover film are integrated with each other. Therefore, the inorganic cover film is, together with the insulating cover layer, a water-vapor barrier for the solid-state battery. That is, the combination of the insulating cover layer and the inorganic cover film integrated with each other more suitably prevents the infiltration of water vapor in the external environment into the solid-state battery.

In the present invention, the supporting substrate that supports the solid-state battery is positioned so as to cover a lower side (bottom side) of the solid-state battery and thus contributes to prevention of the water-vapor transmission from the lower side (bottom side). That is, the supporting substrate is preferably a water-vapor barrier substrate. The "barrier" referred to here is also the same meaning as described above and thus means having a characteristic of blocking the water-vapor transmission in order not to allow water vapor in the external environment to permeate the inorganic cover film and thus in order not to cause degradation of characteristics that is inconvenient to the solid-state battery, and narrowly means the substrate having a water-vapor transmission rate of less than $1.0 \times 10^{-3}$ g/(m²·Day). Therefore, the water-vapor barrier substrate preferably has a water-vapor transmission rate of 0 to less than $1.0 \times 10^{-3}$ g/(m²·Day). As described above, when the supporting substrate is a water-vapor barrier substrate, the substrate itself exerts a barrier effect, and therefore the inorganic cover film is not necessarily disposed on the bottom-surface side of the substrate. In other words, the inorganic cover film is disposed so as to extensively enclose the solid-state battery, but does not particularly need to be disposed on a portion (specifically, the bottom surface) of the supporting substrate (that is, in a preferred aspect, the inorganic cover film is disposed on most of the surfaces of the battery package, but is not disposed on all of the surfaces).

When being a ceramic substrate, the supporting substrate easily exerts the effect of preventing the water-vapor transmission. When the supporting substrate has a water-vapor barrier characteristic, mainly the insulating cover layer and the inorganic cover film can prevent the water-vapor transmission from the upper side and the lateral side of the solid-state battery, whereas mainly the supporting substrate can prevent the water-vapor transmission from the lower side (bottom side) of the solid-state battery. In view of the fact that the supporting substrate is preferably a terminal substrate, mainly the terminal substrate is considered to attain the prevention of the water-vapor transmission from the lower side (bottom side) of the solid-state battery. In the aspect illustrated in FIGS. 3 and 4, not only the supporting substrate 10 but also the combination with the insulating cover layer 30' disposed on the upper surface of the supporting substrate 10 can prevent the water-vapor transmission from the lower side (bottom side).

In another point of view, as understood from, for example, the aspect illustrated in FIGS. 3 and 4, a periphery of the end surface electrode 15 in the solid-state battery 100 is surrounded by the combination of the insulating cover layer 30, the inorganic cover film 50, and the supporting substrate 10. That is, the periphery of the end surface electrode 15 in the solid-state battery 100 is considered to be sealed so as to be enclosed by the combination of the three members. Therefore, for example, a possible entry of water vapor in the external environment from the end surface electrode 15 of the solid-state battery 100 is more certainly prevented. Such a seal can be particularly advantageous when the end surface electrode of the solid-state battery is formed of a sintered metal-based material. This is because such an end surface electrode can sometimes has a pore, a defect, or the like generated depending on the material, the form, or the manufacturing process, and can possibly be insufficient against the transmission of water vapor in an air atmosphere.

Figure 5:
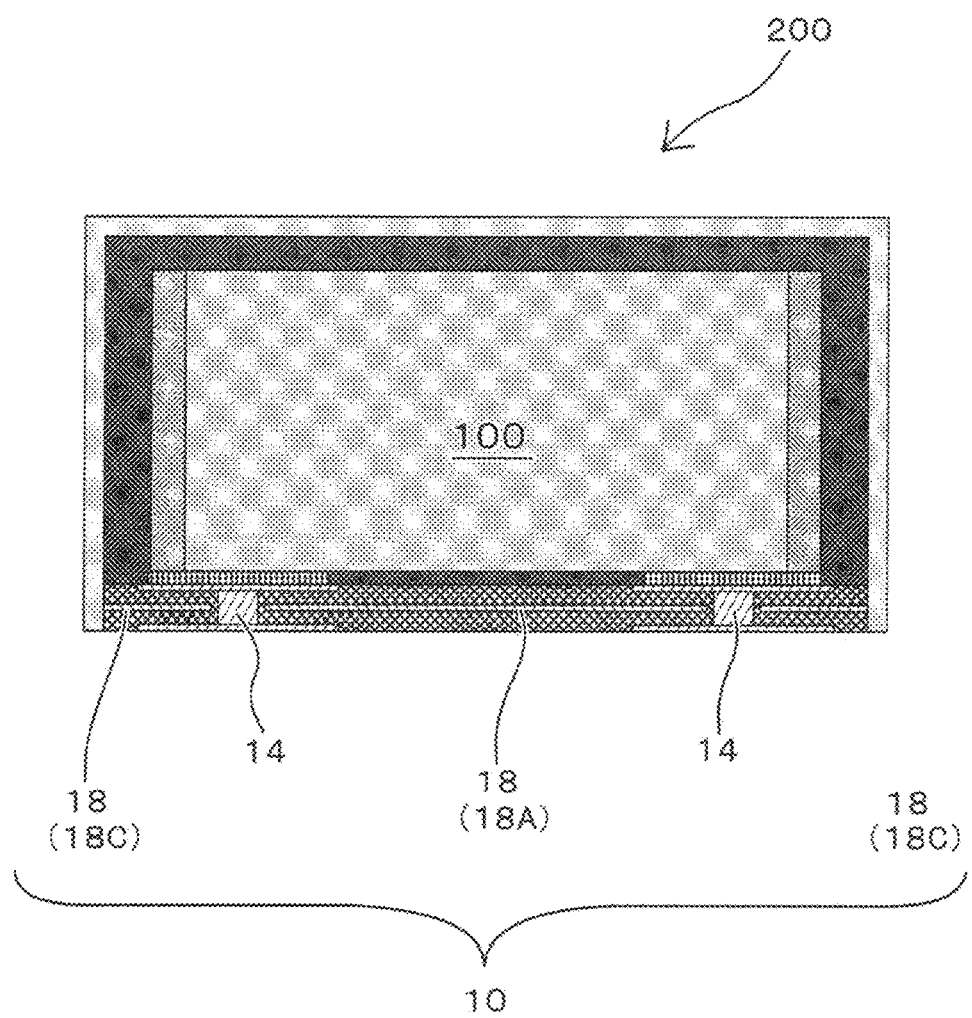
FIG. 5 is a section schematically illustrating a configuration of a packaged solid-state battery according to another embodiment (placement of a non-connected metal layer of a supporting substrate) of the present invention.

As illustrated in FIG. 5, the supporting substrate 10 may include a non-connected metal layer 18 attaining no electrical connection. In view of the fact that the supporting substrate 10 is preferably a terminal substrate, although being such a substrate that is provided for electrical connection, the supporting substrate 10 includes the non-connected metal layer (non-electrically connected metal layer).

In a preferred aspect, the non-connected metal layer 18 is a water-vapor transmission prevention layer. That is, the non-connected metal layer 18 is a layer for improving the prevention of the water-vapor transmission of the supporting substrate (the non-connected metal layer 18 is, due to the material thereof or the like, a layer that prevents the water-vapor transmission). As illustrated in the drawing, the non-connected metal layer 18 to be the water-vapor transmission prevention layer may have a form of being embedded in the body of the supporting substrate. The non-connected metal layer 18 may have a form of extending laterally in the sectional view to more widely contribute to prevention of the water-vapor transmission. This configuration means disposing the non-connected metal layer such that the non-connected metal layer extends in a direction perpendicular to the stacking direction of the solid-state battery. The material metal for the non-connected metal layer may be at least one selected from the group consisting of Cu (copper), Al (aluminum), Ag (silver), Au (gold), Pt (platinum), Sn (tin), W (tungsten), Ti (titanium), Cr (chromium), Ni (nickel), and the like. In a preferred aspect, the non-connected metal layer is formed of a metal foil (copper foil as one example).

The non-connected metal layer to be the water-vapor transmission prevention layer of the supporting substrate may be at least positioned in a substrate region between adjacent vias and/or a non-via region such as a via-outside region in a sectional view of the packaged battery. With reference to the aspect illustrated in FIG. 5, a non-connected metal layer 18A is positioned in a non-via region between adjacent vias 14 of the substrate body, whereas non-connected metal layers 18C are positioned in non-via regions outside the vias 14 of the substrate body. When the supporting substrate, or the terminal substrate is formed of a ceramic substrate, the non-via region is a region formed of a ceramic material, and such a ceramic region further increases the effect of preventing the water-vapor transmission due to the presence of the non-connected metal layer.

The metal layer corresponding to such a water-vapor transmission prevention layer is significant also when the supporting substrate is a resin substrate. That is, in order to increase the effect of preventing the water-vapor transmission of the supporting substrate formed of a resin material, the resin substrate may include a metal layer such as a metal foil (copper foil as just one example). In this aspect, the resin substrate can be more suitable as a water-vapor barrier substrate of the battery package.

In the present invention, the solid-state battery on the supporting substrate has a form of being covered with the inorganic cover film with the insulating cover layer interposed between the solid-state battery and the inorganic cover film, and the insulating cover layer can also act as a buffer member. Specifically, even when the expansion or the contraction of the solid-state battery is generated due to charge and discharge, thermal expansion or the like, the inorganic cover film is not directly affected by the expansion or the contraction, but the insulating cover layer interposed can, for the buffer effect thereof, alleviate the influence. Therefore, in even such a thin film as the inorganic cover film, the generation of a crack or the like is reduced, and a more suitable water-vapor barrier can be given. This effect is particularly substantial when the insulating cover layer contains a resin material, and the insulating cover layer formed of a resin material can increase such a buffer effect.

The insulating cover layer may have a certain elastic modulus to more effectively suppress the influence of the expansion or the contraction of the solid-state battery. That is, in order to reduce a crack or the like generated due to the expansion or the contraction of the solid-state battery, an insulating cover layer having a relatively low elastic modulus may be disposed. The insulating cover layer may have an elastic modulus of, for example, 1 MPa or less, more specifically, 0.5 MPa or less, or 0.1 MPa or less. The lower limit value of the elastic modulus is not particularly limited and is, for example, 10 Pa. The "elastic modulus" referred to herein indicates the so-called Young's modulus [Pa], and the value of the elastic modulus means a value obtained by JIS Standards (JIS K 7161, JIS K 7181, or the like).

Figure 6:
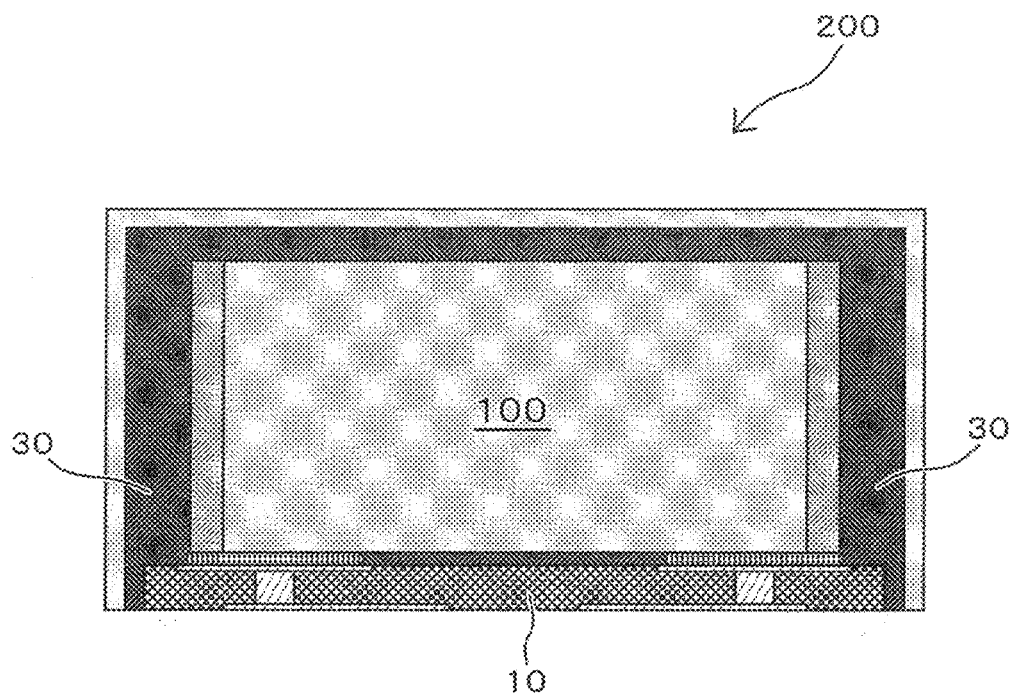
FIG. 6 is a schematic section for describing a modified aspect of an insulating cover film.

The insulating cover layer 30 is not limited to the form illustrated in FIG. 3, but may have a form illustrated in FIG. 6. That is, the insulating cover layer 30 may reach onto as far as a side surface of the substrate 10. In other words, the insulating cover layer 30 covering the top surface and the side surface of the solid-state battery 100 may also cover the side surface of the substrate 10. This configuration enables the solid-state battery to avoid inconvenient peeling of the insulating cover layer caused by the expansion or the contraction of the solid-state battery. This phenomenon is described in detail. When the expansion or the contraction (particularly the expansion or the contraction in the stacking direction of the solid-state battery) of the solid-state battery having the form illustrated in FIG. 3 is excessive, a phenomenon in which the insulating cover layer 30 is peeled from the substrate 10 is easily generated, originating from a bonded interface (particularly, a bonded interface a that constitutes an outermost edge along a direction perpendicular to the stacking direction) between the insulating cover layer 30 and the main surface of the substrate 10. The form illustrated in FIG. 6, however, reduces such a possibility. The insulating cover layer 30 illustrated in FIG. 6 does not form such a bonded surface constituting the outermost edge between the insulating cover layer 30 and the main surface of the substrate 10, and therefore, the insulating cover layer 30 is less likely to be affected by an inconvenient influence of the expansion or the contraction in the stacking direction of the solid-state battery.

Figure 7:
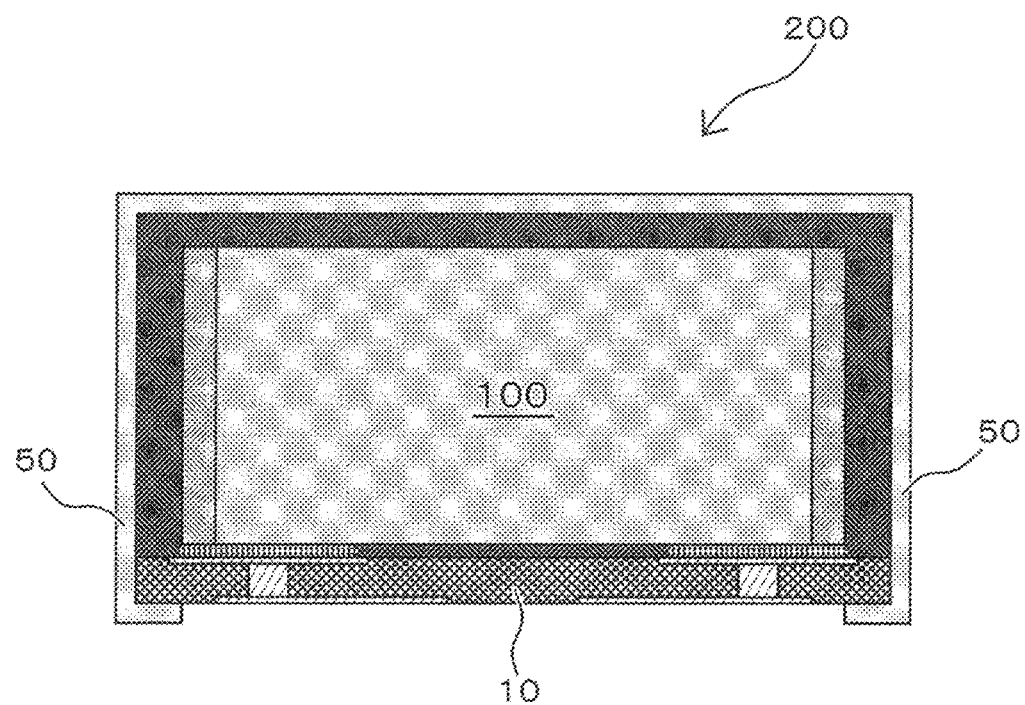
FIG. 7 is a schematic section for describing a modified aspect of an inorganic cover film.
Figure 8:
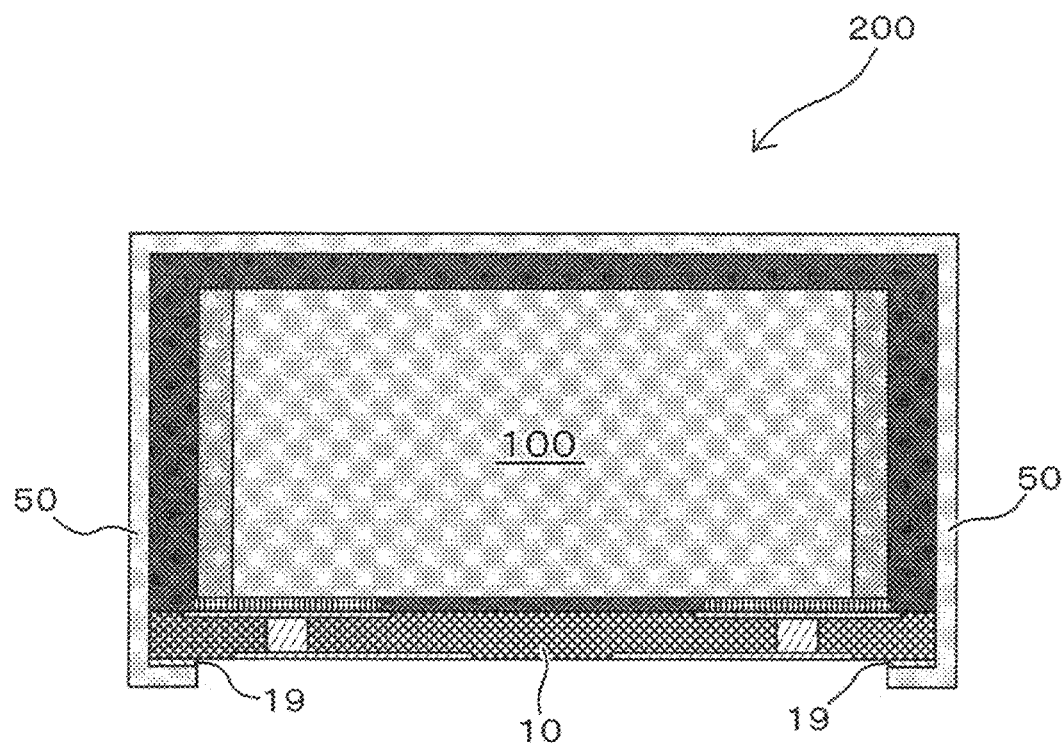
FIG. 8 is a schematic section for describing a modified aspect (use of a metal pad) of the inorganic cover film.

As regards the peeling, the inorganic cover film 50 may also be one less likely to generate peeling between the inorganic cover film 50 and the substrate. For example, the inorganic cover film 50 may have the form illustrated in FIG. 7. Specifically, the inorganic cover film 50 may reach onto the side surface of the substrate 10 and further as far as the lower main surface of the substrate 10. This configuration relatively increases the bonded area between the inorganic cover film 50 and the substrate 10 to make the inorganic cover film 50 more resistant to peeling. In addition, when the substrate is formed of ceramic or the like, a metal pad 19 may be interposed to strengthen the bond between the inorganic cover film 50 and the substrate 10. For example, the metal pad 19 may be disposed on the substrate, while the inorganic cover film 50 being disposed so as to reach the metal pad 19 (see FIG. 8). Such a metal pad may be, as illustrated in the drawing, disposed on, for example, a periphery of the back-side main surface (that is, the bottom-side main surface) of the substrate 10.

Figure 9:
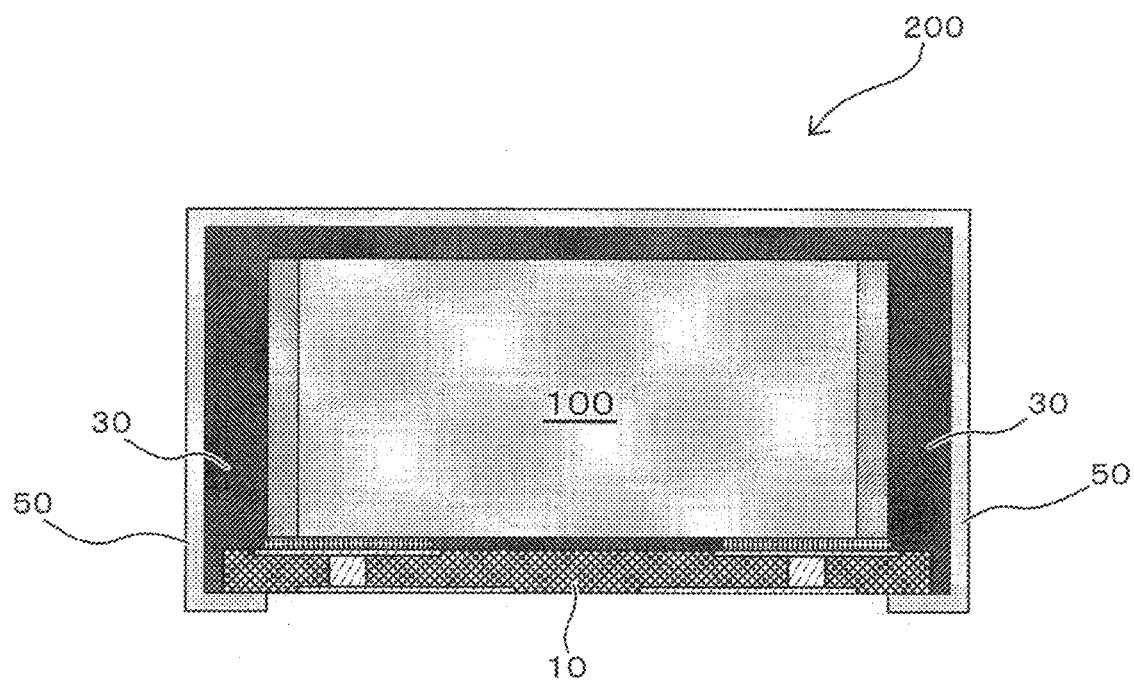
FIG. 9 is a schematic section for describing modified aspects of the insulating cover film and the inorganic cover film.

Furthermore, the insulating cover layer 30 and the inorganic cover film 50 may have a form illustrated in FIG. 9. Specifically, the insulating cover layer 30 may cover the side surface of the substrate 10, while the inorganic cover film 50 reaching as far as the lower-side main surface of the substrate 10. That is, the insulating cover layer 30 covering the top surface and the side surface of the solid-state battery 100 may extend to as far as the side surface of the substrate 10, while the inorganic cover film 50 on the insulating cover layer 30 extending to as far as the lower-side main surface of the substrate 10 beyond the lateral surface of the substrate 10. This form can give a battery package that more suitably prevents the moisture transmission (moisture transmission from the exterior up to the solid-state battery laminate).

Furthermore, although the battery package according to the present invention prevents the water-vapor transmission, the members contributing to the prevention are the inorganic cover thin film integrated with the insulating cover layer, and the supporting substrate that can have a thin plate shape, and therefore the package size is not inconveniently increased. That is, in a preferred aspect, the solid-state battery according to the present invention can be provided as a battery (packaged battery) having high energy density.

The solid-state battery according to the present invention can be embodied in various aspects. For example, the following aspects can be considered.

(Aspect of Multilayer Wiring Board)

In this aspect, the supporting substrate has the form of a multilayer wiring board. That is, the solid-state battery is supported by a supporting substrate formed of a plurality of wiring layers.

Figure 10:
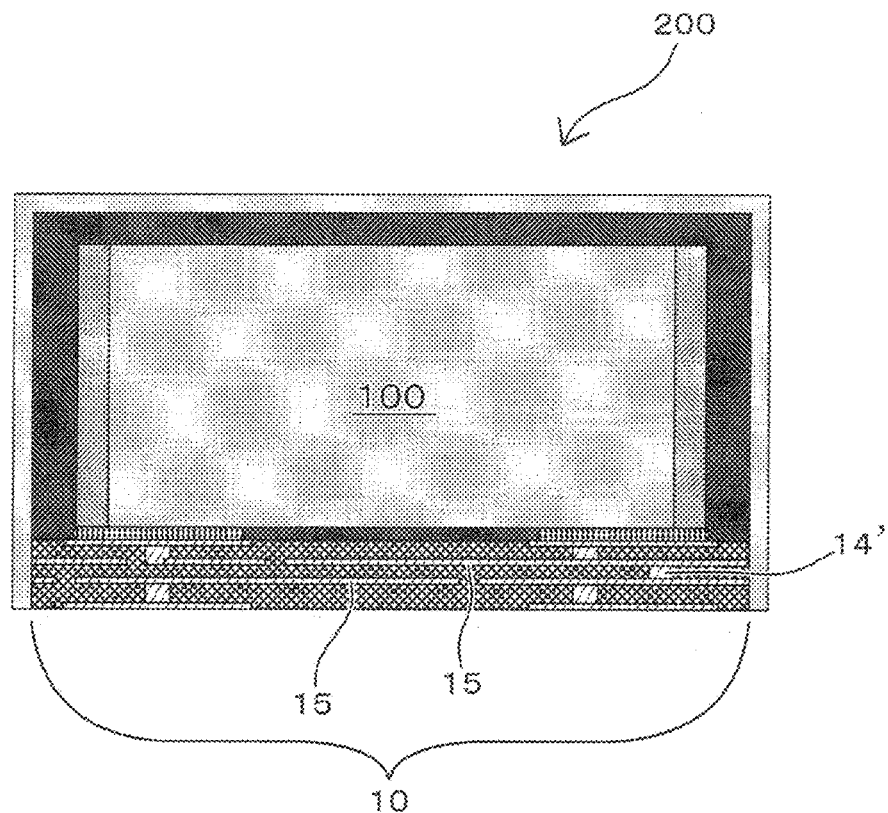
FIG. 10 is a section schematically illustrating a configuration of a packaged solid-state battery according to another embodiment (a supporting substrate in the form of a multilayer wiring board) of the present invention.

For example, as illustrated in FIG. 10, the supporting substrate 10 may be formed of a multilayer wiring board including at least an inner via hole 14' (hereinafter, also referred to as an "inner via"). The illustrated supporting substrate 10, or the terminal substrate includes wiring layers 15 formed therein and the inner via 14' connects upper and lower wiring layers.

The substrate including the multilayer wiring as described above increases the design freedom of the external terminal as the package. That is, the external terminal can be positioned at any location on the bottom surface of the battery package.

A location or its vicinity in the supporting substrate at which the wiring is disposed is a location of the interface between different materials of the wiring and the substrate body portion and becomes sometimes a location unintentionally causing the water-vapor transmission. Even in such cases, the substrate 10 illustrated in FIG. 10 can exert a suitable water-vapor barrier property. This is because the supporting substrate having the form of a multilayer wiring board lengthens "a location in which the water-vapor transmission property is relatively high" that can correspond to a water-vapor entry route. Such a water-vapor entry route can reach the length of a water-vapor transmission route in a capacitor terminal structure (approximately 200 μm at longest) (just an example). That is, the transfer resistance (resistance against moisture) is increased along the moisture route from the external environment up to the solid-state battery, making it difficult for water vapor to enter from the external environment. Thus, a solid-state battery can be achieved that more suitably prevents the water-vapor transmission. In a preferred aspect, the lengthwise wiring in the multilayer wiring board is not connected by a straight via, but the positions of vias may be transversely shifted to each other to meander the lengthwise extending wiring. This configuration enables further lengthening the water-vapor entry route, leading to a battery package that more suitably prevents the entry of water vapor.

The wiring layers 15 themselves that are disposed in the multilayer substrate can be used as the water-vapor transmission prevention layers. As understood from the illustrated aspect, the wiring layers 15 have a form of laterally extending in the sectional view. That is, the internal wiring of the multilayer substrate has a form of extending in a direction perpendicular to the stacking direction of the solid-state battery and can exert the effect of preventing the water-vapor transmission. Speaking of this configuration, a ground electrode in the substrate can be horizontally enlarged in a margin portion of the substrate other than the positive-electrode/negative-electrode signal lines to drastically reduce the area of the entry of water vapor. The supporting substrate having this aspect can also be regarded as including a "barrier solid electrode" blocking the entry of water vapor in a region other than the internal wiring of the supporting substrate.

(Aspect of Contained Filler)

Figure 11:
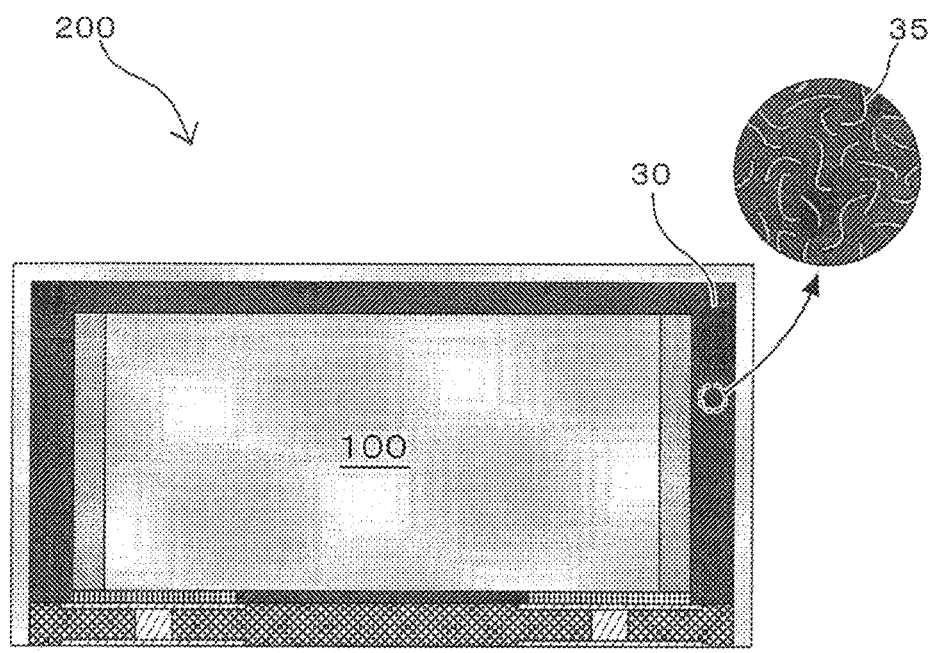
FIG. 11 is a section schematically illustrating a configuration of a packaged solid-state battery according to another embodiment (a filler-containing insulating cover layer) of the present invention.

In this aspect, the insulating cover layer 30 contains a filler 35 (see FIG. 11). When the insulating cover layer 30 is formed of a resin material, the inorganic filler 35 is preferably dispersed in such a resin material.

The filler is preferably mixed in the insulating cover layer and is compositely integrated with a material (e.g., a resin material) for the base material of the insulating cover layer. The shape of the filler is not particularly limited and may be particulate, spherical, needle-shaped, plate-shaped, fibrous and/or irregular. The size of the filler is not particularly limited and may preferably be 10 nm to 100 μm, and the filler may be, for example, a nano-filler having a size of 10 nm to less than 100 nm, a micro-filler having a size of 100 nm to less than 10 um, or a macro-filler having a size of 10 μm to 100 μm. Examples of the material for filler include, but are not limited to, metal oxides such as silica, alumina, titanium oxide, and zirconium oxide; minerals such as mica; and glass.

The filler is preferably a water-vapor transmission prevention filler. In a preferred aspect, the insulating cover layer is formed to contain a water-vapor transmission prevention filler in the resin material of the insulating cover layer. This configuration allows the insulating cover layer to be easily provided as a more suitable water-vapor transmission barrier together with the inorganic cover film.

The water-vapor transmission prevention filler is not particularly limited and may be a plate-shaped filler or the like. The water-vapor transmission prevention filler may contain a material such as silica or alumina. Further, the water-vapor transmission prevention filler may contain, for example, a mica or the like-based material such as synthetic mica. The content of the water-vapor transmission prevention filler contained in the resin material is, for contributing to more suitable prevention of the water-vapor transmission, preferably 50 wt % to 95 wt % and may be, for example, 60 wt % to 95 wt % or 70 wt % to 95 wt % relative to the total of the insulating cover layer.

(Aspect of Sputtered Film)

In a preferred aspect, the inorganic cover film is a sputtered film. That is, a sputtering thin film is disposed as a dry plating film disposed so as to cover the insulating cover layer.

The sputtered film is a thin film obtained by sputtering. That is, a film obtained by sputtering an ion at a target to eject an atom of the target and depositing the atom on the insulating cover layer is used as the inorganic cover thin film.

This sputtered film is a dense and/or homogeneous film while having a very thin form in nano order or micro order, and is therefore preferable as a water-vapor transmission barrier for the solid-state battery. In addition, the sputtered film can be formed by atomic deposition and can have therefore relatively high attachment force to be more suitably integrated with the inorganic cover thin film. Therefore, the sputtered film more suitably and easily constitutes a water-vapor barrier film for the solid-state battery together with the insulating cover layer. That is, the sputtered film disposed together with the insulating cover layer so as to cover at least the top surface and the side surface of the solid-state battery can be more suitably provided as a barrier for not allowing the entry of water vapor in the external environment into the solid-state battery.

In a preferred aspect, the sputtered film is formed to contain at least one selected from the group consisting of, for example, Al (aluminum), Cu (copper), and Ti (titanium) and has a film thickness of preferably 1 μm to 100 μm, for example, most preferably 5 μm to 50 μm. In addition, the sputtered film preferably, but not without limitation, has a substantially same thickness dimension at both a local location positioned on the top surface and a local location positioned on the side surface of the solid-state battery. This is to make it possible for the entire package to more uniformly prevent the infiltration of water vapor in the external environment into the battery.

Figure 12:
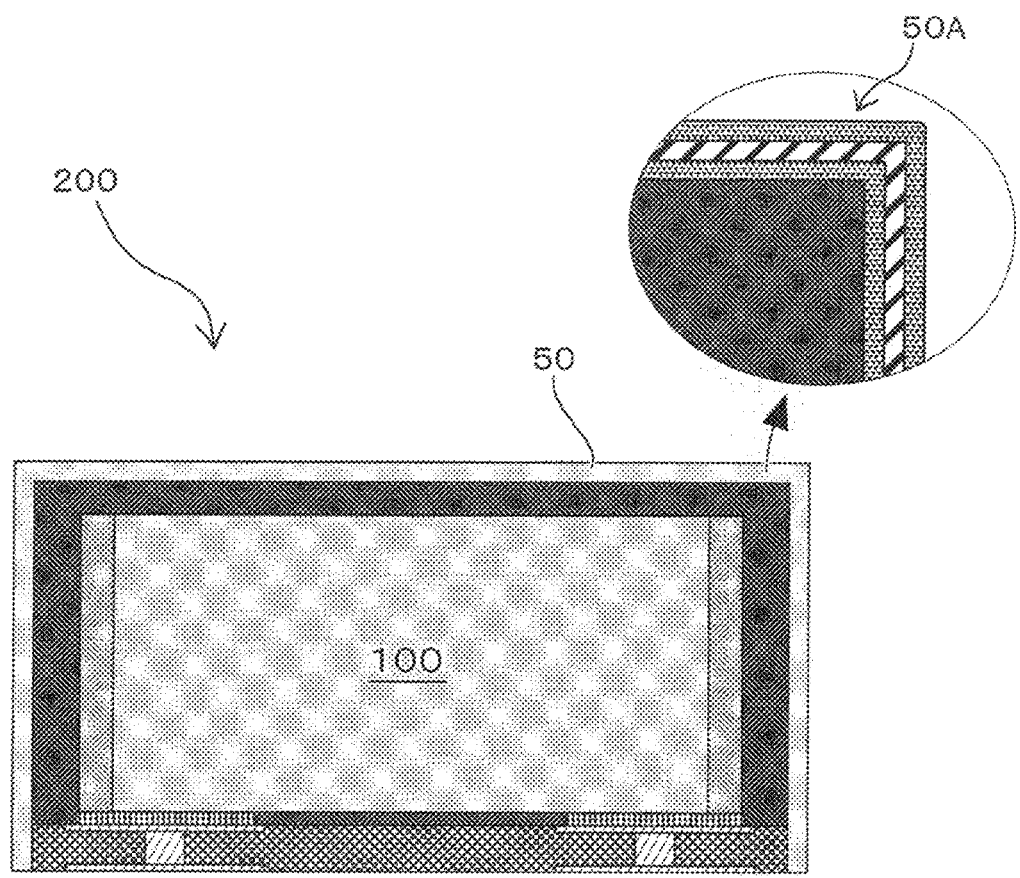
FIG. 12 is a section schematically illustrating a configuration of a packaged solid-state battery according to another embodiment (an inorganic cover film having a multiple-layer structure) of the present invention.

The dry plating film represented by such a sputtered film can be achieved with a more suitable thickness from the viewpoint of the water-vapor barrier. For example, the number of sputtering processes can be relatively increased to provide the sputtered film as a thick film, whereas the number of sputtering processes can be relatively reduced to provide the sputtered film as a thin film. In addition, the sputtered film can also be provided as the inorganic cover film having a stacking structure through, for example, changing the type of the target in the sputtering. In other words, the inorganic cover film 50 can also be disposed as a multiple-layer structure 50A formed of at least two layers as illustrated in FIG. 12. The multiple-layer structure 50A is not particularly limited to including layers of different materials, but may include layers of a same material. The inorganic cover film having such a multiple-layer structure more suitably and easily constitute a water-vapor barrier for the solid-state battery.

A wet plating film may be disposed on the dry plating film. The wet plating film is generally formed at a higher speed than the dry plating film. Therefore, for example, when a film having a large thickness is disposed as the inorganic cover film, the film may be formed efficiently by combining the dry plating film with the wet plating film.

(Aspect of Uniquely Extending Conductive Portion of Supporting Substrate)

In this aspect, the conductive portion of the supporting substrate, such as a via and/or a land, has a uniquely extending form from the viewpoint of preventing the water-vapor transmission.

Figure 13:
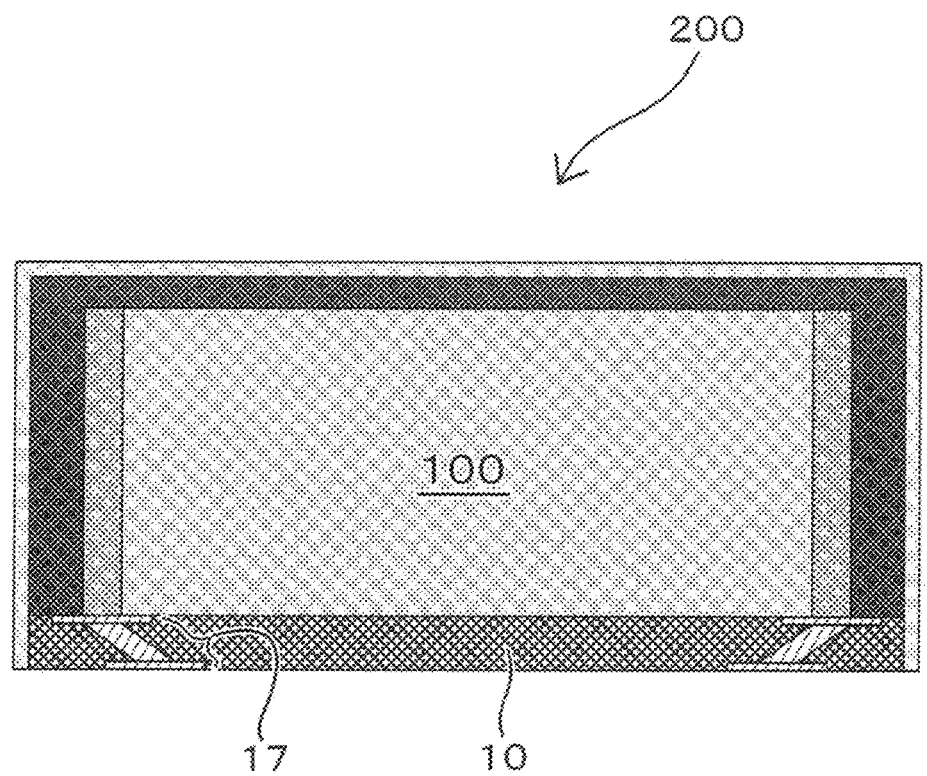
FIG. 13 is a schematic section for describing an aspect in which the supporting substrate includes a diagonally extending conductive portion.

Specifically, as illustrated in FIG. 13, a conductive portion 17 of the supporting substrate, such as a via and/or a land, has a form of diagonally extending so as to be shifted from the thickness direction (the particularly illustrated sectional view is considered to be an aspect including a via portion recognized as diagonally extending as described above). This is a configuration employed in view of the cases in which the conductive portion of the supporting substrate or a location in the vicinity of the conductive portion can be a location causing the water-vapor transmission. The conductive portion 17 of the supporting substrate that diagonally extends so as to be shifted from the thickness direction of the substrate further lengthens the extension of the conductive portion. This configuration can lengthen a route (route allowing an easy entry of water vapor) at a portion having a relatively high water-vapor transmission property in the supporting substrate. Therefore, in this aspect, it is possible to more suitably prevent the water-vapor transmission via the conductive portion of the supporting substrate.

(Aspect Attributed to Manufacturing Method)

In this aspect, the solid-state battery has a feature particularly attributed to packaging of the solid-state battery. The packaged solid-state battery according to the present invention is obtained by the manufacturing method described later and has a feature attributed to the manufacturing method.

Figure 14:
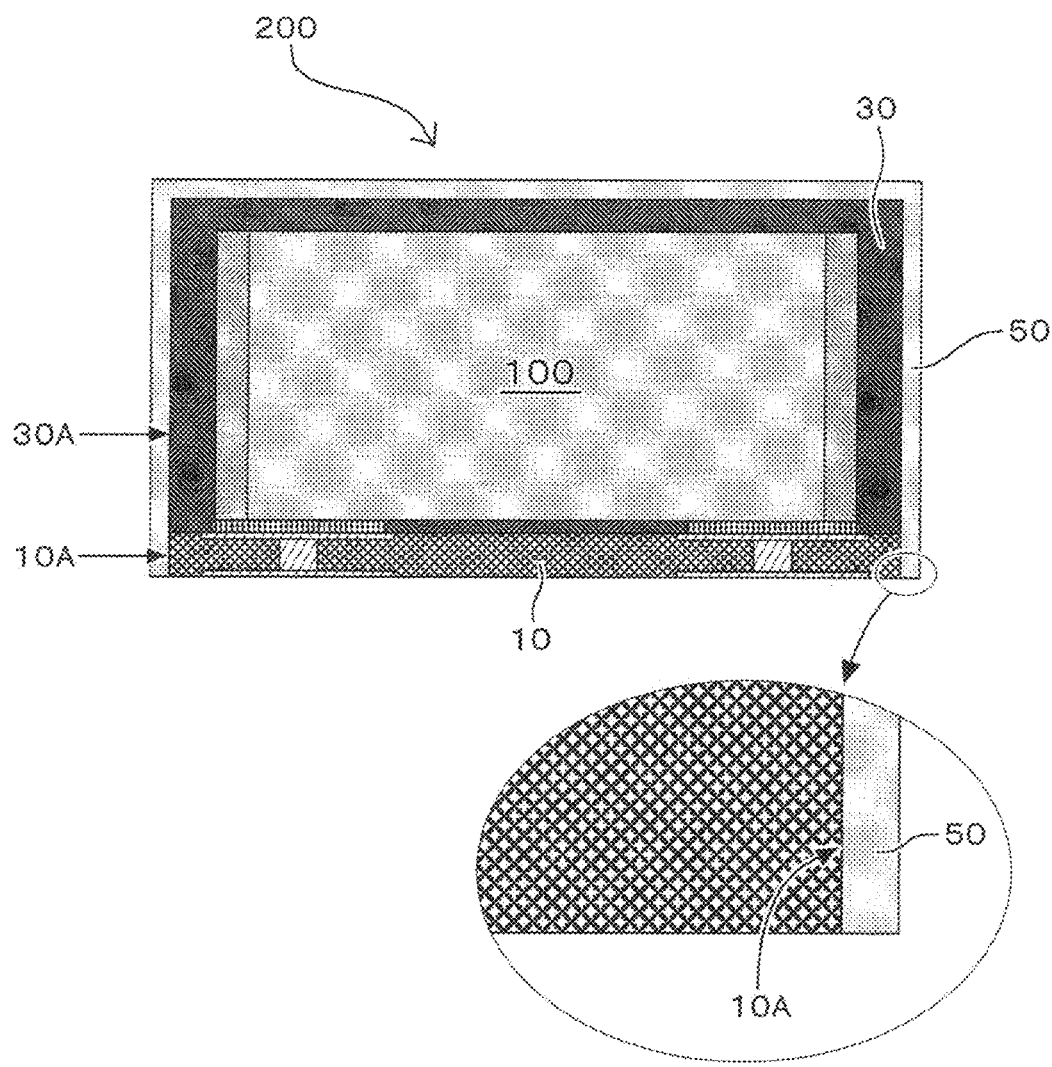
FIG. 14 is a schematic section for describing an aspect in which the inorganic cover film extensively extends so as to reach as far as the supporting substrate, and an aspect in which the supporting substrate is even with the inorganic cover film.

For example, in the solid-state battery according to the present invention, the inorganic cover film is disposed so as to cover the insulating cover layer and extensively disposed so as to reach as far as the supporting substrate. Specifically, in the sectional view of the solid-state battery 100 packaged as illustrated in FIG. 14, the inorganic cover film 50 extends onto a side surface 10A of the supporting substrate 10 beyond the insulating cover layer 30. As understood from the illustrated sectional-view form, this configuration means the inorganic cover film 50 extending to as far as a position beyond the boundary between the insulating cover layer 30 and the supporting substrate 10. Therefore, such an inorganic cover film can be, together with the insulating cover layer, more suitably provided as a water-vapor transmission barrier of the solid-state battery. In the sectional view illustrated in FIG. 14, the inorganic cover film 50 on the side surface of the battery package has a form of extending straight (a form of extending straight in the lengthwise direction of the sectional view). The present invention, however, is not necessarily limited to this form. For example, when a lateral outer surface 30A of the insulating cover layer 30 is wholly positioned slightly more inside (slightly more inside in the transverse direction/the horizontal direction) in the sectional view than the side surface 10A of the supporting substrate 10, the inorganic cover film 50 is extended accordingly. That is, with the inorganic cover film 50 regarded as assumingly extending downward in the sectional view, the inorganic cover film 50 can have a form of extending while slightly widened outward in the vicinity of the boundary between the insulating cover layer 30 and the supporting substrate 10.

The solid-state battery in this aspect can be obtained by preparing a precursor, which is obtained by covering the solid-state battery on the supporting substrate with the insulating cover layer, and further extensively covering the precursor with the inorganic cover film. That is, attributed to the formation of such a large cover, the inorganic cover film 50 reaches onto as far as the side surface 10A of the supporting substrate 10 beyond the insulating cover layer 30. The inorganic cover film having such a unique form can be obtained, for example, by wholly performing sputtering on the precursor obtained by covering the solid-state battery on the supporting substrate with the insulating cover layer.

In a preferred aspect, the supporting substrate 10 is even with the inorganic cover film 50 on the bottom-side surface of the packaged solid-state battery (see FIG. 14). That is, on the mounting surface of the solid-state battery package, the surface level of the supporting substrate is identical with or is substantially identical with the level of the inorganic cover film. Such an "even" feature is attributed to forming the inorganic cover film while the precursor is put on an appropriate platform or the like.

The solid-state battery having the "even" feature means that the mounting surface is suitably flattened/smoothed as a package, and therefore, the solid-state battery has more suitable mountability (particularly SMD characteristics). That is, the inorganic cover film 50 that reaches onto as far as the side surface 10A of the supporting substrate 10 beyond the insulating cover layer 30 and is even with the supporting substrate 10 not only suitably contributes to prevention of the water-vapor transmission, but also can contribute to more suitable surface mountability.

As regards the solid-state battery described above, the advantages of the solid-state battery can be summarized as follows. The following advantages, however, are only illustrative and are not limited, and there may be additional advantages.

The barrier film protecting the all-solid-state battery from water vapor broadly covers the battery without any gap to enable the battery to prevent degradation of characteristics caused by water vapor in the external environment.

The solid-state battery can be, as a SMD-type surface mounting component, solder-mounted on various electronic devices. Particularly, the solid-state battery can be solder-mounted as a SMD improved in heat resistance and/or chemical resistance.

A change in volume caused by charge and discharge or thermal expansion of the all-solid-state battery can be alleviated by the resin layer around the battery to enable alleviation of stress on the water-vapor barrier film and securement of high reliability.

When the solid-state battery is a SMD type and weather resistance treatment (e.g., plating with Ni/Au or the like) is performed on a surface of the supporting substrate for mounting, the effect of preventing the water-vapor transmission is further improved due to the weather resistance treatment.

[Method of Manufacturing Solid-State Battery]

The objective product according to the present invention can be obtained through a process of preparing a solid-state battery that includes battery constituent units having a positive electrode layer, a negative electrode layer, and a solid electrolyte between the electrodes and next packaging the solid-state battery.

The manufacturing of the solid-state battery according to the present invention can be roughly divided into manufacturing of a solid-state battery itself (hereinafter, also referred to as an "unpackaged battery") corresponding to a preliminary step to packaging; preparation of a supporting substrate; and packaging.

<<Method for Manufacturing Unpackaged Battery>>

An unpackaged battery can be manufactured by a printing method such as screen printing, a green sheet method using a green sheet, or a combined method thereof. That is, the unpackaged battery itself may be prepared in accordance with a common solid-state battery manufacturing method (therefore, as the raw materials for a solid electrolyte, an organic binder, a solvent, an optional additive, a positive electrode active material, a negative electrode active material, and the like described below, those used in known solid-state battery manufacturing may be used).

Hereinafter, a manufacturing method is illustratively described for better understanding of the present invention. The present invention, however, is not limited to this method. In addition, the following chronological matters such as a description order are no more than matters of convenience for description and are not necessarily restrictive.

(Formation of Stack Block)

A solid electrolyte, an organic binder, a solvent, and an optional additive are mixed to prepare a slurry. Next, the prepared slurry is sheet-formed into a sheet having a thickness after firing of about 10 μm.

A positive electrode active material, a solid electrolyte, a conductive auxiliary agent, an organic binder, a solvent, and an optional additive are mixed to prepare a positive electrode paste. Similarly, a negative electrode active material, a solid electrolyte, a conductive auxiliary agent, an organic binder, a solvent, and an optional additive are mixed to prepare a negative electrode paste.

The positive electrode paste is applied onto the sheet, and a current collector layer and/or a negative layer is printed as necessary. Similarly, the negative electrode paste is applied onto the sheet, and a current collector layer and/or a negative layer is printed as necessary.

The sheet having the positive electrode paste applied thereto and the sheet having the negative electrode paste applied thereto are alternately stacked to give a stack. The outermost layer (the uppermost layer and/or the lowermost layer) of the stack may be the electrolyte layer, an insulating layer, or the electrode layer.

(Formation of Battery Sintered Body)

The stack is, for lamination, integrated by pressure bonding, and the laminate is then cut into a prescribed size. The obtained cut laminate is degreased and fired. Thus, a sintered laminate is obtained. In the meantime, the laminate having not been cut may be degreased and fired and then cut.

(Formation of End Surface Electrode)

The positive electrode-side end surface electrode can be formed through application of a conductive paste to a positive electrode-exposed side surface of the sintered laminate. Similarly, the negative electrode-side end surface electrode can be formed through application of a conductive paste to a negative electrode-exposed side surface of the sintered laminate. The positive electrode-side and negative electrode-side end surface electrodes disposed so as to reach as far as a main surface of the sintered laminate is preferable, because such a configuration enables the end surface electrodes to be connected at a small area to a mounting land in the next step (more specifically, the end surface electrodes disposed so as to reach as far as a main surface of the sintered laminate includes their folded portions on the main surface, and such folded portions can be electrically connected to mounting lands). The component of the end surface electrodes can be selected from at least one selected from silver, gold, platinum, aluminum, copper, tin, or nickel.

The positive electrode-side and negative electrode-side end surface electrodes are not limited to being formed after sintering the laminate, but may be formed before firing and subjected to simultaneous sintering.

Through the steps described above, a finally desired unpackaged battery can be obtained.

<<Preparation of Supporting Substrate>>

Preparation of the supporting substrate can be obtained, for example, by stacking a plurality of green sheets and firing the stack. This method is used particularly when the supporting substrate is a ceramic substrate. The preparation of the supporting substrate can be performed in accordance with, for example, preparation of a LTCC substrate.

The supporting substrate provided as a terminal substrate includes a via and/or a land. In this case, a hole (diameter size: about 50 μm to about 200 μm) is formed on the green sheet by, for example, punching press or a carbon dioxide laser, and the hole is filled with a conductive paste material, or a precursor of the conductive portion/the wiring such as a via, a land, and/or a wiring layer may be formed by performing, for example, a printing method. The supporting substrate is preferably formed to include, as the water-vapor transmission prevention layer, a non-connected metal layer attaining no electrical connection. In this case, a metal layer (a precursor thereof) to be the non-connected metal layer may be formed on the green sheet in advance. This metal layer may be formed by a printing method or by disposing a metal foil or the like. Next, a prescribed number of such green sheets are overlaid on top of another and subjected to thermal pressure to form a green sheet laminate, which can be fired to give a supporting substrate. The land and the like can also be formed after firing the green sheet laminate.

The green sheet for obtaining the supporting substrate as a ceramic substrate is described in detail. Such a green sheet, however, is just one example and does not limit the present invention. The green sheet itself may be a sheet-shaped member formed to contain a ceramic component, a glass component, and an organic binder component. For example, the ceramic component may be an alumina powder (average particle size: approximately 0.5 to 10 μm), the glass component may be a borosilicate glass powder (average particle size: approximately 1 to 20 μm). The organic binder component may be at least one component selected from the group consisting of, for example, a polyvinyl butyral resin, an acrylic resin, a vinyl acetate copolymer, a polyvinyl alcohol, and a vinyl chloride resin. The green sheet may have 40 to 50 wt % of the alumina powder, 30 to 40 wt % of the glass powder, and 10 to 30 wt % of the organic binder component (relative to the total weight of the green sheet) (just an example). From another viewpoint, the green sheet may have a weight ratio between a solid component (50 to 60 wt % of the alumina powder and 40 to 50 wt % of the glass powder: relative to the weight of the solid component) and the organic binder component, that is, a ratio (the weight of the solid component):(the weight of the organic binder component) of approximately 80 to 90:10 to 20. As a green sheet component, another component may be contained as necessary. For example, a plasticizer imparting softness to the green sheet, such as a phthalate ester, dibutyl phthalate, or a dispersant or an organic solvent of a ketone such as glycol may be contained. The green sheets may each have a thickness itself of approximately 30 μm to 500 μm.

Through the steps described above, a finally desired supporting substrate can be obtained. In the meantime, a printed wiring board, a LTCC substrate, a HTCC substrate, an interposer, or the like having a substrate form in advance may also be used as the supporting substrate, as long as the substrate has a water-vapor transmission rate of less than $1.0 \times 10^{-3}$ g/(m$^2$·Day).

<<Packaging>>

In packaging, the battery and the supporting substrate that are obtained above are used. FIGS. 15(A) to 15(D) schematically illustrates a step of obtaining the solid-state battery according to the present invention by packaging.

Figure 15A:
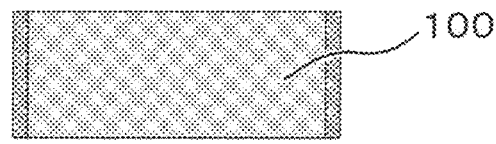
FIGS. 15(A) to 15(D) are sections of a solid-state battery by steps that schematically illustrate a process of obtaining the solid-state battery according to the present invention by packaging.
Figure 15B:
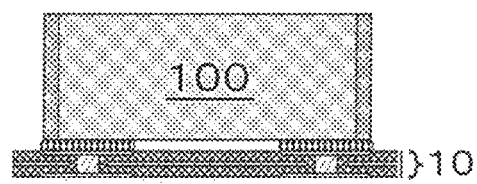

First, as illustrated in FIGS. 15(A) and 15(B), the unpackaged battery 100 is placed on the supporting substrate 10. That is, the "unpackaged solid-state battery" is placed on the supporting substrate (hereinafter, the battery used for packaging is also simply referred to as a "solid-state battery").

Preferably, the solid-state battery is placed on the supporting substrate so as to electrically connect the conductive portions of the supporting substrate and the end surface electrodes of the solid-state battery to each other. A conductive paste may be provided on the supporting substrate to thereby electrically connect the conductive portions of the supporting substrate and the end surface electrodes of the solid-state battery to each other. This configuration is illustratively described in more detail. Positioning adjustment of lands and the end surface electrodes are performed such that a positive electrode-side mounting land on the surface of the support is matched with the folded portion of the positive electrode-side end surface electrode of the solid-state battery and a negative electrode-side mounting land is matched with the folded portion of the negative electrode-side end surface electrode of the solid-state battery, and the lands and the end surface electrodes are bonded for connection using a conductive paste (e.g., an Ag conductive paste). As such a bonding material, a nano-paste, an alloy-based paste, a brazing material, or the like can be used in addition to the Ag conductive paste as long as the material does not need washing such as defluxing after the formation.

Figure 15C:
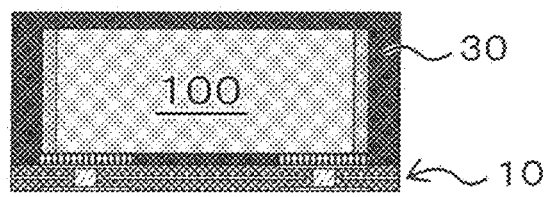

Next, as illustrated in FIG. 15(C), an insulating cover layer 30 is formed so as to cover the solid-state battery 100 on the supporting substrate 10. Therefore, a raw material for the insulating cover layer is provided so as to entirely cover the solid-state battery on the supporting substrate. When the insulating cover layer is formed of a resin material, a resin precursor is disposed on the supporting substrate and subjected to curing or the like to mold the insulating cover layer. In a preferred aspect, the insulating cover layer may be molded through application of pressure with a mold. Compression molding, which is just an example, may be performed to mold the insulating cover layer sealing the solid-state battery on the supporting substrate. The form of the raw material for the insulating cover layer may be granular as long as the raw material is a resin material generally used for molding, and the type of the raw material may be thermoplastic. Such molding is not limited to metallic molding and may be performed through polishing processing, laser processing and/or chemical treatment.

Figure 15D:
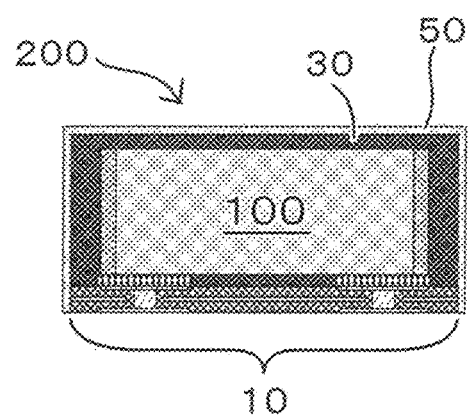

Next, as illustrated in FIG. 15(D), an inorganic cover film 50 is formed. Specifically, the inorganic cover film 50 is formed on "a cover precursor including each solid-state battery 100 that is disposed on the supporting substrate 10 and covered with the insulating cover layer 30." For example, dry plating may be performed to form a dry plating film as the inorganic cover film. More specifically, dry plating is performed to form the inorganic cover film on exposed surfaces other than the bottom surface (that is, other than the bottom surface of the supporting substrate) of the cover precursor. In a preferred aspect, sputtering is performed to form a sputtered film on exposed outer surfaces other than the bottom surface of the cover precursor.

Through the steps described above, a package can be obtained including the solid-state battery that is disposed on the supporting substrate and is entirely covered with the insulating cover layer and the inorganic cover film. That is, the "packaged solid-state battery" according to the present invention can finally be obtained.

As regards such packaging, there is an advantage of relatively facilitating extension of a terminal of the solid-state battery in terms of designing and bonding processing. In addition, while the area ratio of the package to the solid-state battery becomes low as the battery is reduced in size, the packaging of the present invention enables drastic reduction of the package area to particularly contribute to reduction in size of a small-capacity battery.

The embodiments of the present invention have been heretofore described which, however, have been only illustratively described as typical examples. The present invention is not limited to these embodiments, and a person skilled in the art would easily understand that various aspects of the present invention can be considered within a scope that does not change the gist of the present invention.

For example, in the description above, the drawings are used illustrating the supporting substrate that has the form of a one-to-one relationship between the upper and lower lands. The present invention, however, is not limited to this form of lands. As regards the upper land and the lower land connected to each other by a via, they may be different in quantity. For example, as regards a pair of the upper land and the lower land connected to each other by a via, the ratio of the upper land to the lower land may be one to two or more. With this freedom of the form of lands, the battery package according to the present invention can achieve a SMD having higher design freedom.

Further, in the description above, the solid-state battery on the substrate is assumed to have a form of including the constituent layers stacked in a stacking direction along the normal direction of the main surface of the substrate. The present invention, however, is not limited to this form. For example, the solid-state battery may be disposed on the substrate such that the stacking direction of the solid-state battery is a direction perpendicular to the normal direction of the main surface of the substrate. In this case, an inconvenient phenomenon of allowing the battery to contact with the substrate due to the expansion or the contraction (particularly the expansion or the contraction in the stacking direction of the solid-state battery) of the solid-state battery is less likely to be generated.

Figure 16:
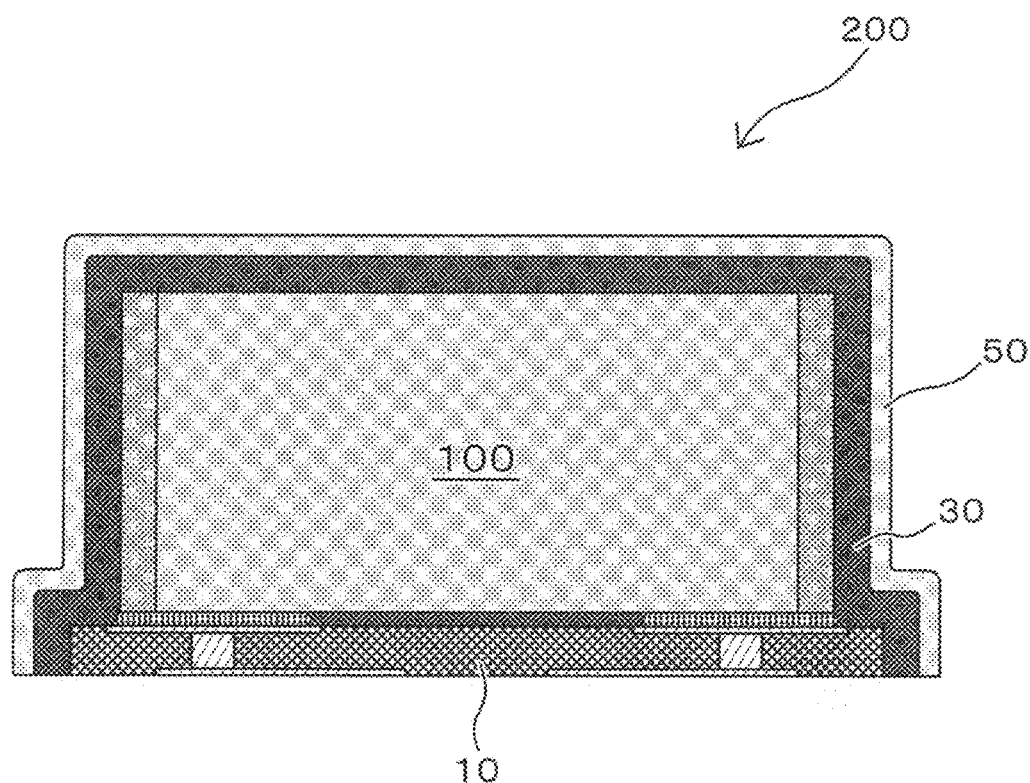
FIG. 16 is a schematic section for describing the form of the cover film formed by an application method.

Further, in the description above, the aspect of molding the insulating cover layer so as to extensively seal the solid-state battery on the substrate through compression molding. The present invention, however, is not limited to this aspect. The insulating cover layer may be formed using, for example, an application method such spraying. When an application method is used, the sectional-view shape of the insulating cover layer 30 can be, as illustrated in FIG. 16, one relatively largely reflecting the outlines of the substrate 10 and the solid-state battery 100 on the substrate 10. In this case, the sectional-view shape of the inorganic cover film 50 disposed on the insulating cover layer 30 can also be one relatively largely reflecting the outlines of the substrate and the solid-state battery on the substrate.

In the description above, the solid-state battery that prevents the water-vapor transmission has been described. The present invention, however, is not limited to this effect. For example, the supporting substrate, the insulating cover layer, and the inorganic cover film exert the effect of preventing the water-vapor transmission, and can, for such a high protection and prevention characteristic, exert an effect of preventing foreign matter in the external environment from being mixed in the solid-state battery and further contribute to prevention of leakage of a reactant of the solid-state battery to the exterior. In the meantime, an additional coating film may be disposed on the inorganic cover film as necessary, from the viewpoint of, for example, preventing rust on the inorganic cover film. For example, an organic coating film formed of a resin or the like may be disposed on the inorganic cover film.

Furthermore, the packaging in the present invention is not limited to the solid-state battery, but is similarly applicable to a thin film battery or a polymer battery containing no liquid electrolytic solution. Therefore, similarly applying the supporting substrate, the insulating cover layer, and the inorganic cover film to such a battery can give a battery package that suitably prevents the water-vapor transmission.

The battery package according to the present invention can be regarded as preferably including a resin layer molded between the solid-state battery and the barrier film/the barrier substrate, and therefore the battery package has high mechanical strength, is not deformed by internal or external stress, and is thus mountable on high-precision instruments.

The packaged solid-state battery according to the present invention is usable in various fields where use of a battery or power storage is expected. The packaged solid-state battery according to the present invention is usable in electronics mounting fields (just an example). In addition, the electrode according to the present invention is usable in electric/information/communication fields where a mobile device or the like is used (e.g., mobile device fields of a mobile phone, a smartphone, a laptop computer, a digital camera, an activity meter, an arm computer, electronic paper, and the like), home and small industrial applications (e.g., fields of an electric tool, a golf cart, and a home/care/industrial robot), large industrial applications (e.g., fields of a forklift, an elevator, and a bay harbor crane), transportation system fields (e.g., fields of a hybrid vehicle, an electric vehicle, a bus, a train, an electric assist bicycle, an electric motorcycle, and the like), power system applications (e.g., fields of various types of power generation, a road conditioner, a smart grid, a general home-installed power storage system, and the like), medical applications (medical device fields of an earphone hearing aid and the like), medicinal applications (fields of a dose management system and the like), IoT fields, space/deep sea applications (e.g., fields of a spacecraft, a submersible research vessel, and the like), and the like.

DESCRIPTION OF REFERENCE SYMBOLS

10: Supporting substrate
10A: Side surface of supporting substrate
14: Via
14': Inner via
15: Wiring layer
16: Land
17: Conductive portion (substrate wiring) of supporting substrate
18: Non-connected metal layer
18A: Non-connected metal layer (non-via region between adjacent vias in substrate region)
18B: Non-connected metal layer (non-via region outside via)
19: Metal pad
30: Insulating cover layer
30': Insulating cover layer (particularly insulating cover layer between solid-state battery and supporting substrate)
35: Filler
50: Inorganic cover film
50A: Multiple-layer structure of inorganic cover film
60: Conductive connection portion
80: Protection circuit/charge and discharge control circuit
100: Solid-state battery
100A: Top surface (upper surface) of solid-state battery
100B: Side surface of solid-state battery
110: Positive electrode layer
120: Negative electrode layer
130: Solid electrolyte
150: End surface electrode
150A: Positive electrode-side end surface electrode
150B: Negative electrode-side end surface electrode
200: Battery package (packaged solid-state battery)

The invention claimed is:

1. A packaged solid-state battery, comprising:
a solid-state battery having a top surface, a bottom surface, and side surfaces connecting the top surface to the bottom surface;
a supporting substrate supporting the bottom surface of the solid-state battery;
an insulating cover layer covering the top surface and the side surfaces of the solid-state battery; and
an inorganic cover film on the insulating cover layer,
wherein the supporting substrate includes wiring electrically connecting an upper surface and a lower surface of the supporting substrate forms a terminal substrate having an external terminal electrically connected to the solid-state battery.

2. The packaged solid-state battery according to claim 1, wherein the inorganic cover film is a water-vapor barrier film.

3. The packaged solid-state battery according to claim 2, wherein the supporting substrate is a water-vapor barrier substrate.

4. The packaged solid-state battery according to claim 1, wherein the inorganic cover film and/or the supporting substrate has a water-vapor transmission rate of less than $1.0 \times 10^{-3}$ g/(m²·Day).

5. The packaged solid-state battery according to claim 1, wherein the wiring of the supporting substrate and an end surface electrode of the solid-state battery are electrically connected to each other.

6. The packaged solid-state battery according to claim 5, further comprising a conductive connection portion on the supporting substrate that electrically connects the wiring of the supporting substrate and the end surface electrode to each other.

7. The packaged solid-state battery according to claim 6, wherein the insulating cover layer is disposed in a gap between the solid-state battery and the supporting substrate.

8. A packaged solid-state battery, comprising:
a solid-state battery having a top surface, a bottom surface, and side surfaces connecting the top surface to the bottom surface;
a supporting substrate supporting the bottom surface of the solid-state battery;
an insulating cover layer covering the top surface and the side surfaces of the solid-state battery; and
an inorganic cover film on the insulating cover layer,
wherein the inorganic cover film is a dry plating film.

9. The packaged solid-state battery according to claim 1, wherein the insulating cover layer contains a resin material.

10. The packaged solid-state battery according to claim 1, wherein the insulating cover layer contains a filler.

11. The packaged solid-state battery according to claim 10, wherein the filler is a water-vapor transmission prevention filler.

12. The packaged solid-state battery according to claim 1, wherein the supporting substrate contains a ceramic.

13. The packaged solid-state battery according to claim 1, wherein the inorganic cover film is a sputtered film.

14. The packaged solid-state battery according to claim 1, wherein the supporting substrate is a multilayer wiring board including an inner via hole.

15. The packaged solid-state battery according to claim 1, wherein the supporting substrate includes a non-connected metal layer having no electrical connection.

16. The packaged solid-state battery according to claim 15, wherein the non-connected metal layer is a water-vapor transmission prevention layer.

17. The packaged solid-state battery according to claim 1, wherein the inorganic cover film extends onto a side surface of the supporting substrate in a sectional view of the packaged solid-state battery.

18. The packaged solid-state battery according to claim 1, wherein the supporting substrate is even with the inorganic cover film on a bottom-side surface of the packaged solid-state battery.

19. The packaged solid-state battery according to claim 1, wherein the solid-state battery is a sintered body.

20. The packaged solid-state battery according to claim 1, wherein a positive electrode layer and a negative electrode layer of the solid-state battery are layers configured to store and release lithium ions.

* * * * *